(12) United States Patent
Jalagam et al.

(10) Patent No.: US 10,747,786 B2
(45) Date of Patent: Aug. 18, 2020

(54) SPONTANEOUS NETWORKING

(71) Applicant: Box, Inc., Redwood City, CA (US)

(72) Inventors: Sesh Jalagam, Union City, CA (US); Matthew DeLand, San Francisco, CA (US); Victor De Vansa Vikramaratne, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 94 days.

(21) Appl. No.: 16/051,447

(22) Filed: Jul. 31, 2018

(65) Prior Publication Data

US 2019/0034520 A1 Jan. 31, 2019

Related U.S. Application Data

(60) Provisional application No. 62/539,367, filed on Jul. 31, 2017.

(51) Int. Cl.
*G06F 16/28* (2019.01)
*H04L 29/06* (2006.01)
(Continued)

(52) U.S. Cl.
CPC ............ *G06F 16/288* (2019.01); *G06F 16/27* (2019.01); *G06F 16/285* (2019.01);
(Continued)

(58) Field of Classification Search
CPC ...... G06F 16/288; G06F 16/27; G06F 16/285; H04L 65/4084; H04L 65/605;
(Continued)

(56) References Cited

U.S. PATENT DOCUMENTS 9,781,457 B1\* 10/2017 James ..................... G06F 16/44
2010/0049534 A1\* 2/2010 Whitnah ................ G06Q 30/02
705/319

(Continued)

OTHER PUBLICATIONS

Reynolds, Douglas. "Gaussian mixture models." Encyclopedia of biometrics (2015): 827-832.

(Continued)

*Primary Examiner* — Michael A Keller
(74) *Attorney, Agent, or Firm* — Vista IP Law Group, LLP

(57) ABSTRACT

Systems for forming and maintaining spontaneous networks of collaborators in shared content management systems. A shared content management system supports user interactions with content objects. A service of the content management system monitors occurrences of interactions between users and objects. The users are associated with collaboration groups. To generate recommendations of groups other than the collaboration group or groups in which a particular user is already a member, a method embodiment receives entity relationship scores from the service. An entity relationship score quantifies a relationship between two subject entities that are common to a particular entity interaction event. The method then assigns the subject entities to one or more spontaneously-generated clusters. As clusters are formed and populated, cluster affinity scores are continuously calculated. Periodically, a recommended cluster is selected based on a corresponding cluster affinity score. A recommended cluster is named based on the member entities of the recommended cluster.

20 Claims, 19 Drawing Sheets

(51) Int. Cl.
  *H04L 29/08* (2006.01)
  *G06F 16/27* (2019.01)
  *G06Q 10/10* (2012.01)

(52) U.S. Cl.
  CPC ......... *G06Q 10/101* (2013.01); *H04L 65/403* (2013.01); *H04L 65/4084* (2013.01); *H04L 65/605* (2013.01); *H04L 67/10* (2013.01); *H04L 67/1097* (2013.01); *H04L 67/22* (2013.01)

(58) Field of Classification Search
  CPC ....... H04L 67/22; H04L 67/10; H04L 65/403; H04L 67/1097; G06Q 10/101
  See application file for complete search history.

(56) References Cited

U.S. PATENT DOCUMENTS

| | | | | |
|---|---|---|---|---|
| 2011/0264736 | A1* | 10/2011 | Zuckerberg | G06Q 30/02 709/204 |
| 2016/0021179 | A1* | 1/2016 | James et al. | G06F 3/04817 709/204 |
| 2018/0150897 | A1* | 5/2018 | Wang et al. | G06Q 30/0631 |

OTHER PUBLICATIONS

Schaeffer, Satu Elisa. "Graph clustering." Computer science review 1.1 (2007): 27-64.
Ioandre, "MCL Spark", URL:https://github.com/joandre/MCL_spark/blob/master/README.md, Mar. 4, 2017.

* cited by examiner

US 10,747,786 B2

SPONTANEOUS NETWORKING

CROSS-REFERENCE TO RELATED APPLICATION(S)

The present application claims the benefit of priority to U.S. Patent Application Ser. No. 62/539,367 titled "SPONTANEOUS NETWORKING", filed Jul. 31, 2017, which is hereby incorporated by reference in its entirety.

FIELD

This disclosure relates to shared content management, and more particularly to techniques for real-time formation of cluster recommendations.

BACKGROUND

A set of members comprising a group of collaborators can be selected using a variety of criteria. For example, the members might be selected based on members' shared interests or respective skill sets. In many industries today, collaboration group members will often interact over a set of computer-readable content objects (e.g., text files, spreadsheets, mixed text and graphics documents, programming code files, etc.) as they work together to achieve a common goal.

Modern distributed computing and storage platforms (e.g., cloud-based content management platforms) have evolved to facilitate secure sharing of large volumes of such content among trusted collaborators that are geographically dispersed and/or whom may or may not know one another. For example, a large content owner (e.g., enterprise) with thousands of global users (e.g., employees) and many terabytes of content might use a cloud-based content management platform to efficiently and securely facilitate content access to various individual users and/or collaborative groups of users. The constituency of the set of individual users can be very dynamic (e.g., employees come and go, change roles, etc.) as can the content itself (e.g., as content objects are added, deleted, edited, reorganized, etc.). Further, the number of collaborating users, and the number of content objects supported or subsumed by the distributed computing and storage platforms continue to scale to ever larger numbers.

Unfortunately, identification of the most meaningful collaboration groups in such dynamic shared content environments presents many computing challenges. As an example, a user "u1" in San Francisco who is interacting with files "f1" and "f5" might not know of the possible synergetic benefits that can be achieved by joining a collaboration group with a user "u3" and (for example) a newly hired user "u9" in Seoul who just began interacting with files "f1" and "f5". Legacy approaches have several deficiencies that demand improvements in order to be used in modern collaboration systems. Specifically, in environments comprising a large number of users that continually interact with a large number of content objects, the formation of collaboration clusters using legacy techniques consume an inordinate amount of computing resources, storage resources, and networking resources. Moreover, legacy techniques fail to facilitate identification of collaboration clusters that pertains to a particular reason or component of a collaboration cluster. Therefore, what is needed are technological solutions that improve over legacy techniques and/or over other considered approaches that address problems attendant to real-time identification and scoring of collaboration groups that remain relevant even as time progresses.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for forming collaboration cluster recommendations, which techniques advance the relevant technologies to address technological issues with legacy approaches. More specifically, the present disclosure describes techniques used in systems, methods, and in computer program products for event-based clustering of collaboration entities in highly dynamic shared content environments. Certain embodiments are directed to technological solutions that respond to a stream of entity interaction events to cause ongoing updates of collaboration clusters and corresponding cluster affinity scores.

The aforementioned technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of recommendation systems as well as advances in various technical fields related to file sharing and collaboration systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
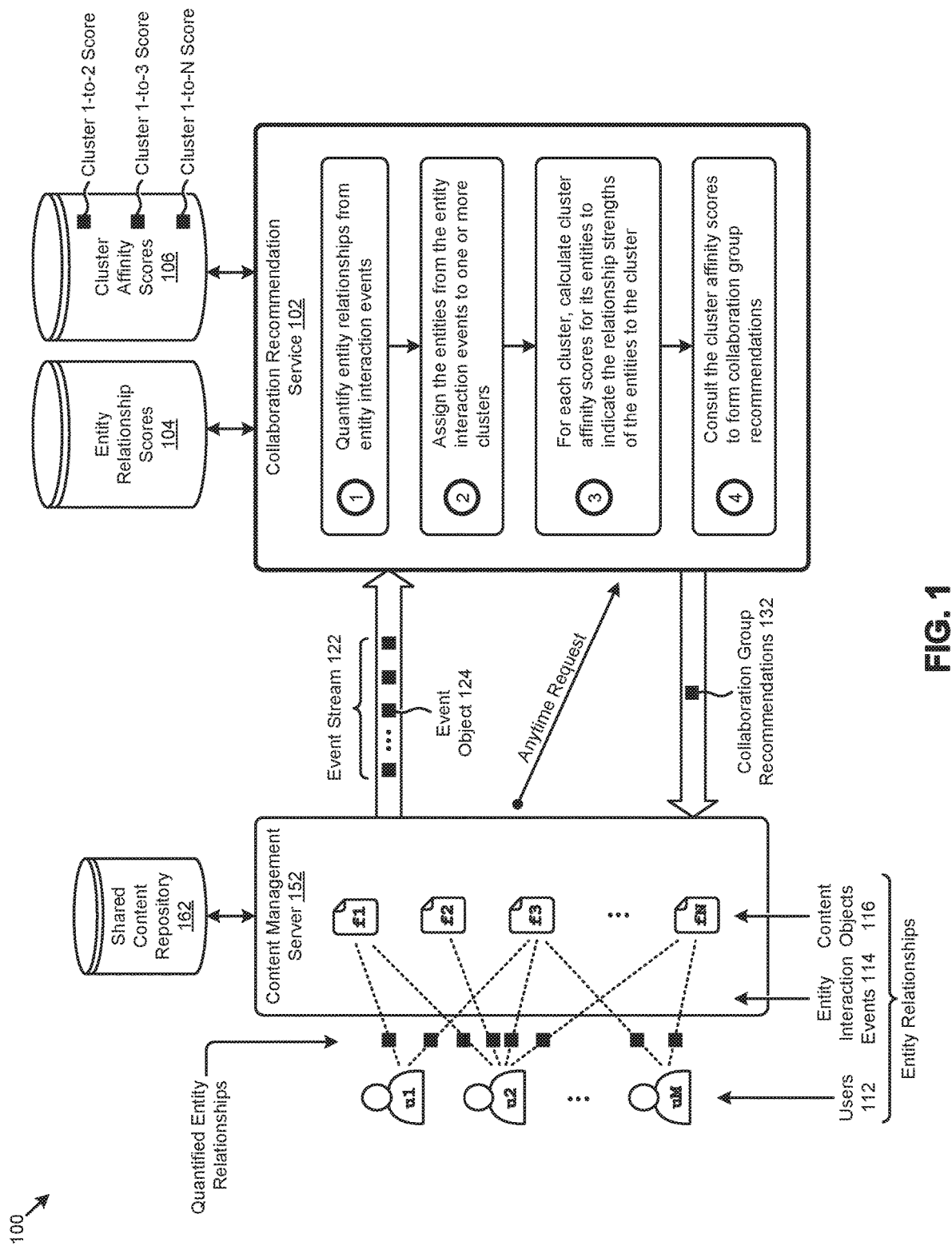
FIG. 1 depicts several implementation techniques used to facilitate event-based clustering of collaboration entities in highly dynamic shared content environments, according to some embodiments.

Embodiments in accordance with the present disclosure address the problem of real-time identification and scoring of collaboration groups that remain relevant as time progresses. Some embodiments are directed to approaches for responding to a stream of entity interaction events to cause ongoing updates of collaboration clusters and corresponding cluster affinity scores to facilitate real-time collaboration group recommendations. The accompanying figures and discussions herein present example environments, systems, methods, and computer program products for event-based clustering of collaboration entities in highly dynamic shared content environments.

Many cluster analysis techniques and embodiments have been considered. Some cluster analysis techniques include iterative processes over which certain parameters (e.g., thresholds, comparison functions, etc.) are modified to achieve a desired clustering result. For example, one set of parameters in one iteration might result in formation of no distinguishable clusters, while another set of parameters in another iteration might result in formation of too many clusters. Cluster formation techniques as alternatives to tuning via parameterization, are disclosed hereunder.

The approaches disclosed herein eschew the introduction of delay between the time that user information records are captured and processed and the time the clusters are formed. Thus, cluster recommendations are presented while they are still likely to be relevant. More specifically, recommended collaboration groups are formed continuously so as to be able to emit the then-current collaboration group clusters that are relevant with respect to the latest real-time events.

Overview

A stream of user activities (e.g., interaction events) are continually captured so as to facilitate production of continually updated clusters of entities (e.g., users, files, etc.) which in turn are used to form collaboration groups. In certain embodiments, a set of entity relationship scores (e.g., user-to-object scores, user-to-user scores, object-to-object scores, etc.) are received responsive to the interaction events (e.g., a content object preview, an edit event, a delete event, etc.). The entities associated with the received entity relationship scores are assigned to one or more clusters. In some cases, an entity might have been previously assigned to a particular cluster.

A cluster affinity score for each entity in each of the clusters is then calculated to indicate a relationship strength between the entity and the respective cluster. The cluster affinity scores are consulted to identify the clusters to which a particular entity is most strongly related. In certain embodiments, the identified clusters are presented in a user interface. As an example, the identified clusters can be presented to a particular user in the form of recommended collaboration groups. In certain embodiments, the cluster affinity scores are stored as key-value pairs sorted by value to facilitate efficient retrieval of the clusters most strongly related to a particular entity. In certain embodiments, the retrieval efficiency is further supported by a composite key.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 depicts several implementation techniques 100 used to facilitate event-based clustering of collaboration entities in highly dynamic shared content environments. As an option, one or more variations of implementation techniques 100 or any aspect thereof may be implemented in the context of the architecture and functionality of the embodiments described herein. The implementation techniques 100 or any aspect thereof may be implemented in any environment.

The diagram shown in FIG. 1 is merely one example representation of the herein disclosed techniques that facilitate event-based clustering of collaboration entities in highly dynamic shared content environments. As shown, a set of users 112 (e.g., user "u1", user "u2", . . . , user "uM") interact with a set of content objects 116 (e.g., file "f1", file "f2", file "f3", . . . , file "fN"). Content objects 116 can be any content object (e.g., file, folder, document, image, video, etc.) from a shared content repository 162. In certain embodiments, access to and/or interaction with content objects 116 can be facilitated by a content management server 152.

As earlier mentioned, in modern distributed computing and storage platforms (e.g., cloud-based content management platforms), the makeup of users 112 is often very dynamic (e.g., employees come and go, change roles, etc.) as is the makeup of content objects 116 in shared content repository 162 (e.g., content objects are frequently added, deleted, edited, reorganized, etc.). Further, users 112, content objects 116, and content owners managed by such distributed computing and storage platforms can expand over time to ever larger and larger numbers. In many cases, identification of the most meaningful collaboration groups in such dynamic shared content environments presents many computing challenges. As an example, user "u1" in San Francisco who is interacting with files "f1" and "f3" might not know of the possible synergetic benefits that can be achieved by joining a collaboration group comprising user "u2" in Seoul, who is also interacting with files "f1" and "f3", as well as user "uM" in London, who is interacting with file "f3".

Legacy approaches to identifying collaboration groups might implement certain cluster analysis techniques to form clusters of users that can be designated as "collaboration groups" for the users comprising the clusters. Such an approach has several deficiencies that result in wasteful consumption of computing, storage, and networking resources. Such legacy approaches can further introduce delays between the time that the user information records used to form the clusters are captured and the time the clusters are formed. This delay can result in clusters that are no longer relevant.

The herein disclosed techniques address the foregoing deficiencies by responding to a stream of entity interaction events so as to produce continually updated clusters of entities (e.g., users, files, etc.) to facilitate real-time formation of collaboration groups. In certain embodiments, as illustrated, occurrences of entity interaction events 114 between pairs of entities invoke a stream (e.g., event stream 122) of event objects (e.g., event object 124) that are detected at a collaboration recommendation service 102. As shown, an entity as used herein can describe a user or a content object. An entity might also represent a computing process or computing device that interacts with content objects and/or other entities. An entity might further represent a collection of entities, such as an enterprise that comprises a set of users, or a folder that comprises a set of files.

Various entity relationships associated with the entities involved with entity interaction events are quantified in a set of entity relationship scores 104 (operation 1). For example, an entity interaction event that pertains to user "u1" editing file "f3" might correspond to an entity relationship score of "10" for the "u1-f3" entity pair. The entities associated with the entity interaction event are assigned to one or more clusters (operation 2). In some cases, an entity might have been previously assigned to a particular cluster. A cluster affinity score for each entity in each of the clusters then is calculated to indicate a relationship (e.g., affinity) strength between the entity and the respective cluster (operation 3). The cluster affinity scores (e.g., cluster affinity scores 106) are consulted to identify the clusters to which a particular entity is most strongly related (e.g., the clusters with the highest cluster affinity scores) to facilitate real-time recommendation of those clusters as collaboration groups to the entity (operation 4). For example, the three clusters that have the highest three cluster affinity scores for user "u1" can be delivered to content management server 152 as collaboration group recommendations 132 for display in a user interface.

Due at least in part to the application of the herein-described techniques, the foregoing operations that result in recommendations of collaboration groups can be performed in real-time. Formation of, and ongoing maintenance of the data structures used herein facilitate such real-time recommendations. Moreover, in comparison to the earlier mentioned legacy approaches, the herein disclosed techniques serve to reduce the demand for computing, storage, and networking resources in part by eliminating the reliance on capturing and storing a historical log of the entity interaction events 114 and/or of entity information records to facilitate formation of the clusters. Rather, the herein disclosed techniques facilitate manipulation (e.g., formation, modification, etc.) of the clusters and quantification (e.g., scoring) of the affinity of the cluster constituents (e.g., entities) in real time, responsive to the entity interaction events 114. Such real-time cluster management and constituent scoring further result in clusters (e.g., collaboration groups) that remain relevant to their respective constituents as time progresses.

Figure 2:
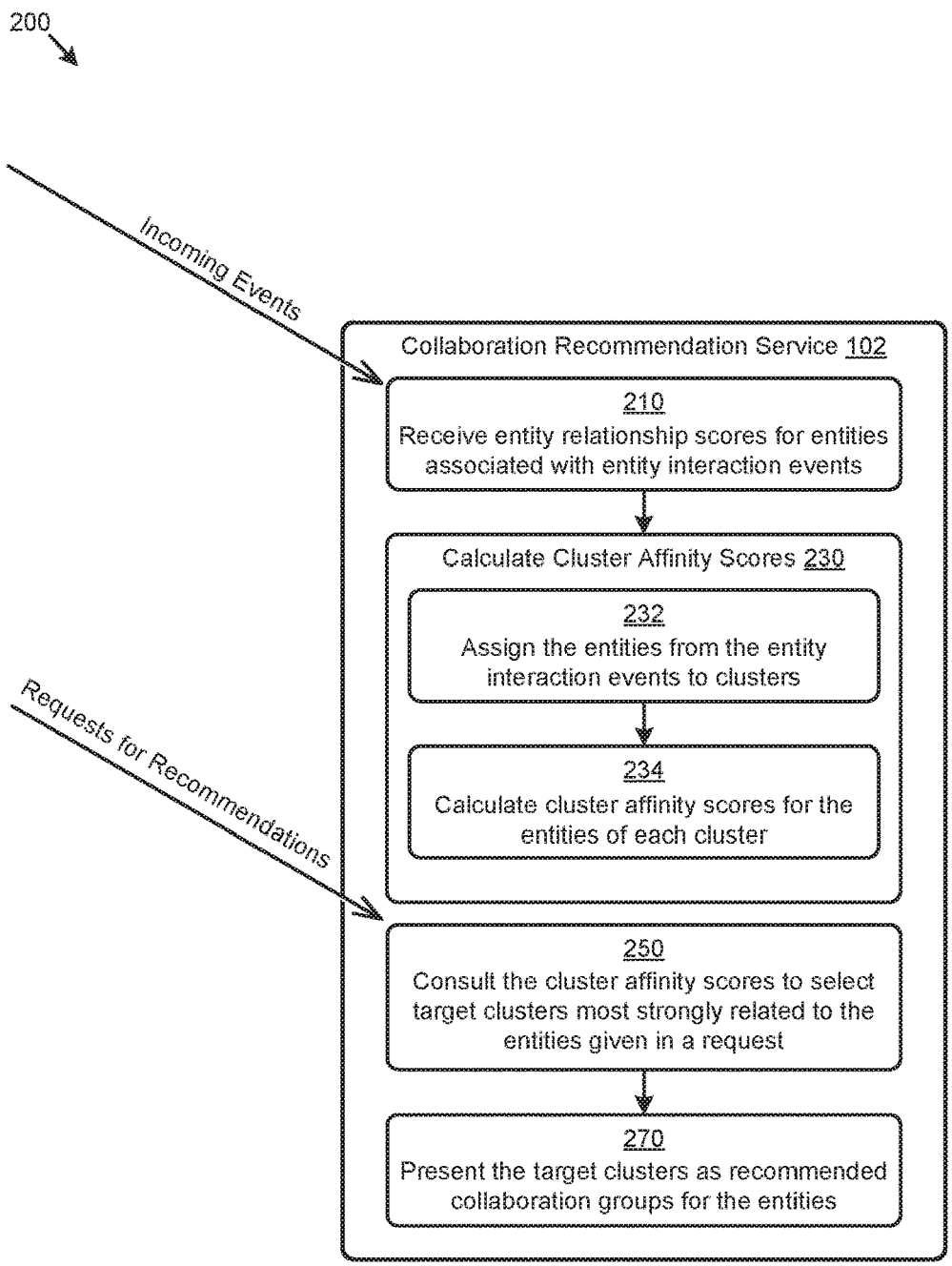
FIG. 2 depicts an event-based collaboration group recommendation technique as used in systems that issue collaboration group recommendations using event-based clustering of collaboration entities, according to some embodiments.

Several event-based collaboration group recommendation techniques implemented according to the herein disclosed techniques are shown and described as pertains to FIG. 2.

FIG. 2 depicts an event-based collaboration group recommendation technique 200 as used in systems that issue collaboration group recommendations using event-based clustering of collaboration entities. As an option, one or more variations of event-based collaboration group recommendation technique 200 or any aspect thereof may be implemented in the context of the architecture and functionality of the embodiments described herein. The event-based collaboration group recommendation technique 200 or any aspect thereof may be implemented in any environment.

The event-based collaboration group recommendation techniques 200 present one embodiment of certain steps and/or operations that facilitate issuance of collaboration group recommendations using event-based clustering of collaboration entities. As shown, the steps and/or operations can be performed at collaboration recommendation service 102. As illustrated, the event-based collaboration group recommendation techniques 200 can commence by receiving entity relationship scores for the entities associated with various entity interaction events (step 210). An entity relationship score quantifies a relationship between a pair of entities. In the embodiment of FIG. 2, at least one of the entities associated with a particular entity relationship score is involved in a respective entity interaction event. In this case, the entity relationship score might indicate the type of interaction that occurred. For example, an entity interaction event between a user and a content object might result in a user-to-object entity relationship score of "10" if the interaction pertained to an edit of the content object, or a user-to-object entity relationship score of "6" if the interaction pertained to merely a preview of the content object.

Further details regarding general approaches to determining entity relationship scores such as user-to-object interaction scores are described in U.S. Application Ser. No. 62/539,341 titled "EVENT-BASED COLLABORATOR RECOMMENDATIONS", filed on Jul. 31, 2017, which is hereby incorporated by reference in its entirety.

A subset of steps and/or operations to calculate cluster affinity scores (step 230) can commence with assigning the entities from the entity interaction events to a set of clusters (step 232). Cluster affinity scores for the entities of each cluster are then calculated (step 234). In some cases, calculation of cluster affinity scores can be constrained to the entities comprising the entity pairs associated with the earlier received entity relationship scores. A cluster affinity score quantifies a relationship (e.g., affinity) strength between an entity and a respective cluster. A particular entity is often associated with multiple clusters. In this case, the entity will have multiple scores corresponding to each respective cluster. At any moment in time, the cluster affinity scores can be consulted to select one or more target clusters to which the entities are most strongly related (step 250). For example, the clusters associated with the highest cluster affinity scores of a respective entity can be selected as the target clusters for that entity. The target clusters are then presented as recommended collaboration groups to the entities (e.g., users) (step 270). Streams of incoming events are processed as they come in and requests for recommended collaboration groups are processed as they come in. As such, events and requests can be processed asynchronously.

Figure 3A:
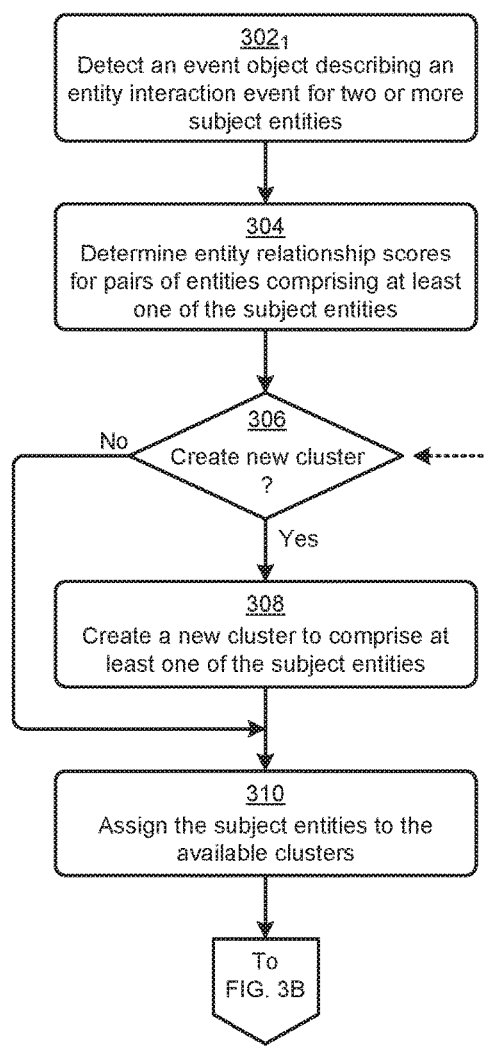
FIG. 3A and FIG. 3B present a cluster affinity scoring technique as implemented in systems that implement event-based clustering of collaboration entities in highly dynamic shared content environments, according to an embodiment.
Figure 3A:
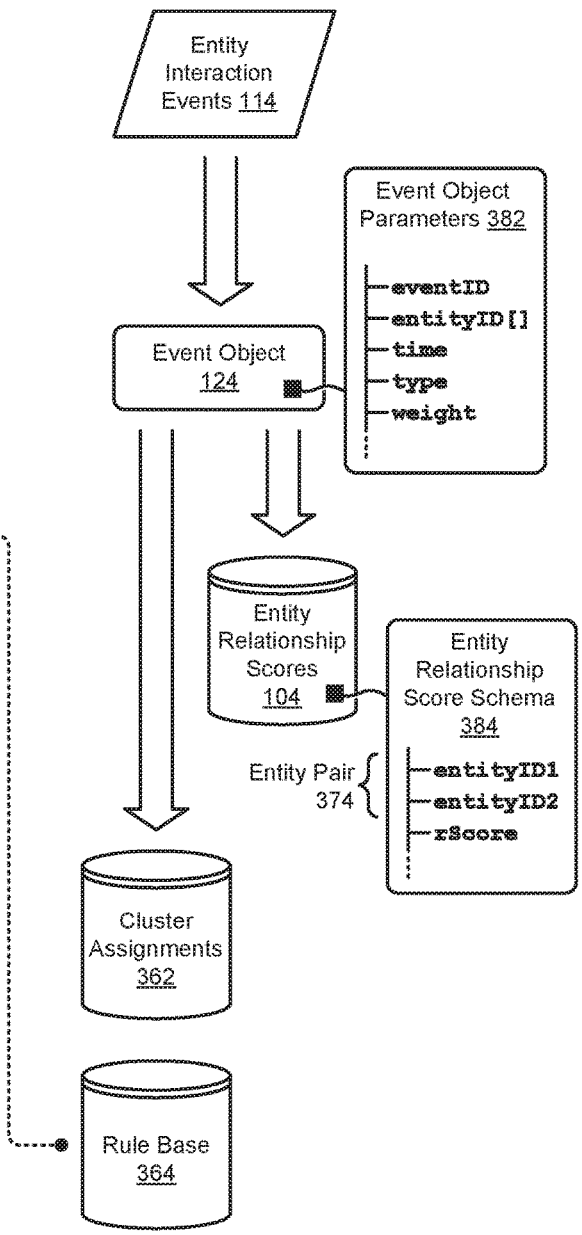
Figure 3B:
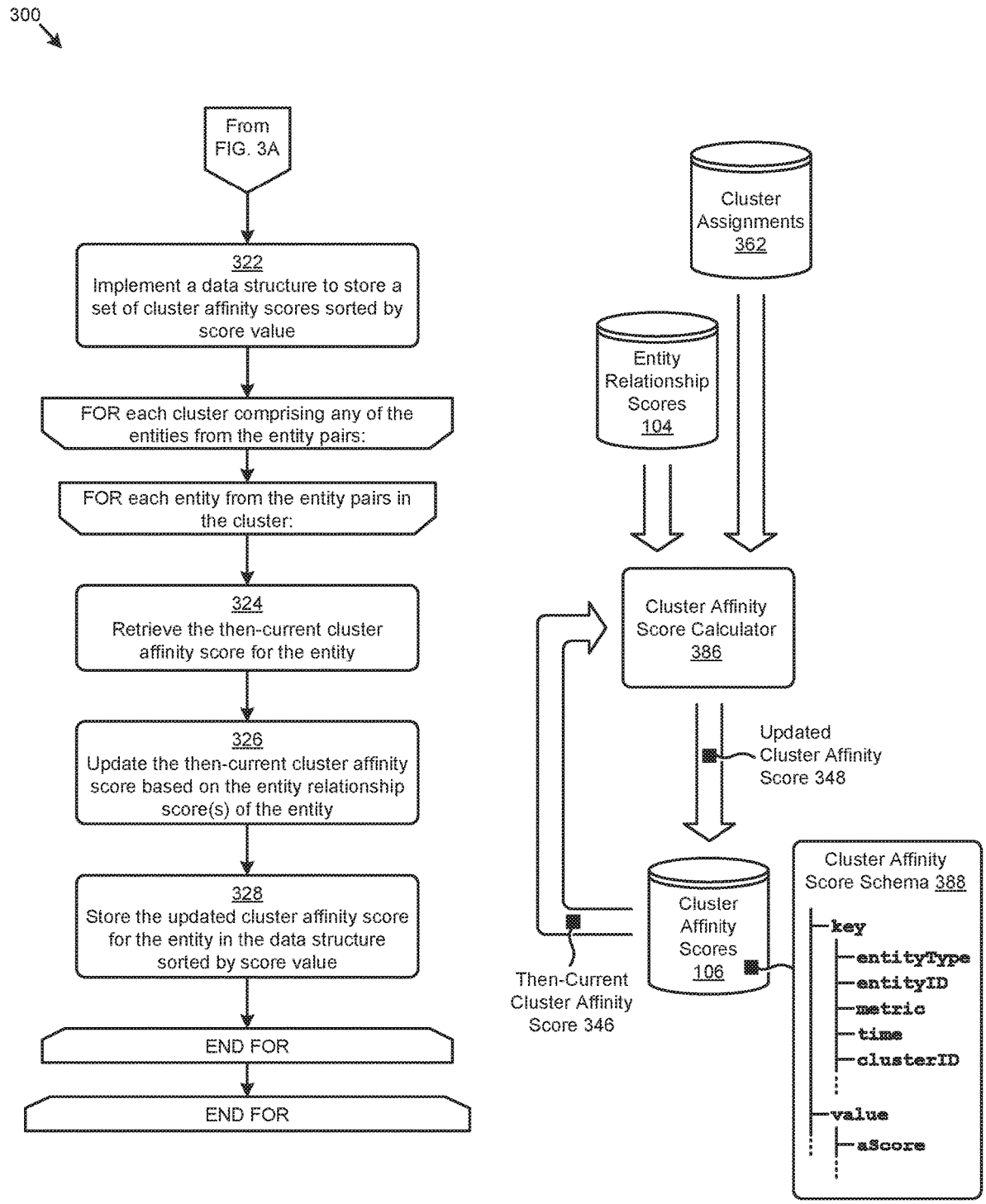

A detailed embodiment of step 230 of FIG. 2 is presented and discussed as pertains to FIG. 3A and FIG. 3B.

FIG. 3A and FIG. 3B present a cluster affinity scoring technique 300 as implemented in systems that implement event-based clustering of collaboration entities in highly dynamic shared content environments. As an option, one or more variations of cluster affinity scoring technique 300 or any aspect thereof may be implemented in the context of the architecture and functionality of the embodiments described herein. The cluster affinity scoring technique 300 or any aspect thereof may be implemented in any environment.

The cluster affinity scoring technique 300 presents one embodiment of certain steps and/or operations that calculate cluster affinity scores to facilitate event-based clustering of collaboration entities in highly dynamic shared content environments. Various illustrations are also presented to depict the cluster affinity scoring technique 300. Further, specialized data structures designed to improve the way a computer stores and retrieves data in memory when performing steps and/or operations pertaining to cluster affinity scoring technique 300 are also shown in FIG. 3A and FIG. 3B.

As shown, the cluster affinity scoring technique 300 can commence by detecting an event object that describes an entity interaction event associated with two or more subject entities (step 3021). For example, and as illustrated, an event object 124 that is generated in response to one or more of entity interaction events 114 (e.g., a user "u1" interacts with a file "f1") might be detected. The event objects comprise data that characterize the entity interaction events. Specifically, as depicted in event object parameters 382, the event objects can be organized (e.g., in an object instance) to associate a particular entity interaction event identified by an event identifier (e.g., stored in an "eventID" field) with a list of entity identifiers (e.g., stored in an "entityID[ ]" object), a timestamp (e.g., stored in a "time" field), an interaction event type (e.g., stored in a "type" field), an interaction weight (e.g., stored in a "weight" field), and/or other event parameters. In certain embodiments, the interaction weight might correspond to the interaction event type. For example, an interaction weight of "10" might be assigned to an "edit" interaction, while an interaction weight of "6" might be assigned to a "preview" interaction.

At least some of the event parameters derived from the event object are used to determine entity relationship scores for pairs of entities that each comprise at least one of the subject entities (step 304). As an example, an entity interaction event involving user "u1" and file "f1" might result in a set of entity relationship scores corresponding to pairs of entities that comprise user "u1" or file "f1" (e.g., a "u1-f1" pair, "u1-uN" pair, "f1-fN" pair, "u1-eN" pair, etc.). The entity relationship scores can be derived from various attributes (e.g., interaction weight) pertaining to the invoking entity interaction event and/or from other information. As depicted in an entity relationship score schema 384, entity relationship scores 104 can be organized and/or stored (e.g., in a relational database table or an object instance) to associate a particular pair of entities (e.g., entity pair 374) identified by entity identifiers (e.g., stored in an "entityID1" field and an "entityID2" field) with a score value (e.g., stored in an "rScore" field), and/or other parameters. Scores can be calculated and stored for retrieval using a score keeping service. Any instances of such a score keeping service can run concurrently with any instances of a collaboration recommendation service. Moreover a score keeping service can calculate, store and retrieve scores for relationships between any pair of entities. Such a score keeping capability facilitates the herein-disclosed techniques for scoring clusters based on all possible combinations of entities in a cluster.

Responsive to entity interaction events 114, the subject entities are assigned to various available clusters (step 310). Such assignments might be codified in a set of cluster assignments 362. In some cases, a particular subject entity might be assigned to an existing cluster so that no new cluster is created (see "No" path of decision 306). In other cases, a new cluster is created (see "Yes" path of decision 306) for at least one of the subject entities (step 308). For example, one or more of the subject entities associated with a particular entity interaction event might have no then-current cluster assignments. In this case, a decision (decision 306) is made as to whether the subject entity is assigned to a newly created cluster and/or assigned to an existing cluster.

This decision operation facilitates a control over the number of clusters formed in systems that implement event-based clustering of collaboration entities in highly dynamic shared content environments, according to the herein disclosed techniques. In certain embodiments, decision 306 and/or other steps and/or operations might be constrained by a rulebase 364. A set of rules such as rulebase 364 comprise data records storing various information that can be used to form one or more constraints to apply to certain functions and/or operations. The information pertaining to a rule in the rulebase might comprise the conditional logic operands (e.g., input variables, conditions, constraints, etc.) and/or operators (e.g., "if", "then", "and", "or", "greater than", "less than", etc.) for forming a conditional logic statement that returns one or more results and/or invokes one or more actions.

Other variations of rules and/or additional rules for making decisions to control the number of clusters formed can be codified into a rulebase. For example, according to the herein disclosed techniques, rulebase 364 might comprise information to constrain the number of clusters for a given entity (e.g., a user) to no more than 10 clusters. Or, in some situations, a rule might be codified to fire such that a new cluster is formed for each member, rather than putting multiple members into the same cluster. In still other situations, a new cluster or clusters can be formed based on a score (e.g., a user-to-file score or a file-to-cluster score). Rules can be codified to take into account any observable values and/or combinations of observable values that pertain to the then-current conditions. In some situations the rulebase includes no rules that set or enforce a threshold or limit on the number of clusters that a user can be part of. A rulebase can be stored in any computer-readable location.

Referring to FIG. 3B, the cluster affinity scoring technique 300 further implements a data structure to store a set of cluster affinity scores sorted by score value (step 322). As earlier mentioned, a cluster affinity score quantifies a relationship (e.g., affinity) strength between an entity and a respective cluster. The data comprising cluster affinity scores 106 and/or any data structure described herein can be organized and/or stored using various techniques. For example, the data comprising cluster affinity scores 106 might be organized and/or stored in a tabular structure (e.g., relational database table) that has rows corresponding to a particular entity and columns corresponding to attributes (e.g., cluster and score) pertaining to that entity.

As another example, cluster affinity scores 106 might be organized and/or stored in a programming code object that has instances corresponding to a particular entity and properties corresponding to the various attributes pertaining to that entity. In certain embodiments, cluster affinity scores 106 might be organized and/or stored in a key-value store with entries that have keys comprising an entity identifier for a particular entity and values (e.g., scores) associated with that particular entity. More specifically, and as depicted by cluster affinity score schema 388, the "key" of a key-value pair might be a composite key comprising an "entityType" element describing an entity type, an "entityID" element describing an entity identifier, a "metric" element describing a metric type (e.g., cluster score), a "time" element describing the timestamp corresponding to when the key-value entry is written, a "clusterID" element describing a cluster identifier, and/or other key elements. The "key" is mapped to the "value" of the key-value pair, which can comprise an "aScore" element to store the cluster affinity score. The foregoing key elements can serve different purposes pertaining to management of and/or access to the key-value store. For example, the "entityType" and "entityID" elements might comprise portions of the key (e.g., portions of a partition key) that are used to identify the location of a certain partition (e.g., the user "u1" partition) of the key-value store. Further, the "metric" and "time" elements might serve as the monotonically increasing portions of the key (e.g., sort keys) that are used to order the key-value pairs in an append-only key-value store.

As an example, the cluster affinity scores for user "u1" can be written to a particular partition (e.g., associated with user "u1") in a key-value store in a time sequence corresponding to a decreasing score value. The top N clusters comprising user "u1" can then be retrieved by merely manipulating a composite key that points to the top N cluster score entries of the user "u1" partition. In some cases, the "clusterID" element might be appended to the end of the key to facilitate low latency retrieval of the cluster identifiers of the top N entries.

Figure 6:
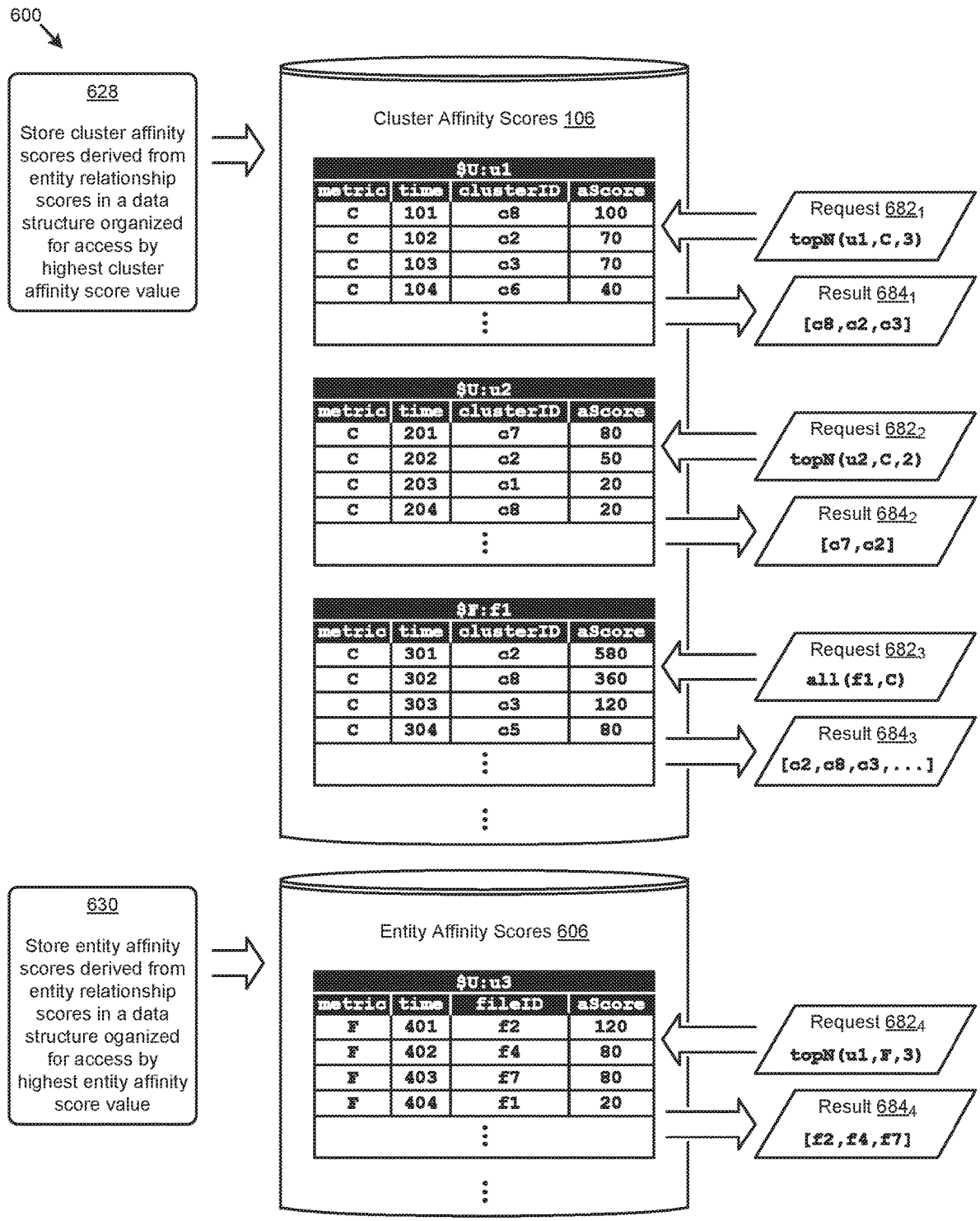
FIG. 6 depicts a collaboration group identification scenario as implemented in systems that perform event-based clustering of collaboration entities in highly dynamic shared content environments, according to an embodiment.

Further details pertaining to implementing a key-value store to store cluster affinity scores and/or other information are described and shown as pertains to FIG. 6.

As can be observed, certain steps and/or operations of cluster affinity scoring technique 300 are iteratively performed in a set of nested "FOR" loops. The first "FOR" loop (e.g., "outer" loop) pertains to the clusters comprising any of the entities from the entity pairs for which instances of the entity relationship scores 104 were determined responsive to a particular set of detected entity interaction events (e.g., as shown and described as pertains to FIG. 3A). The second "FOR" loop (e.g., "inner" loop) pertains to the foregoing entities from the entity pairs. Specifically, for each of these entities, the then-current cluster affinity score for the entity is retrieved (step 324). For example, a cluster affinity score calculator 386 might consult the entity relationship scores 104 and/or the cluster assignments 362 to retrieve a then-current cluster affinity score 346 for a particular entity from the cluster affinity scores 106. The then-current affinity score is then updated based at least in part on the entity relationship score or scores of the entity (step 326). For example, the cluster affinity score calculator 386 can access the entity relationship scores 104 and the then-current cluster affinity score 346 to determine an updated cluster affinity score 348. The updated cluster affinity score is then stored in the data structure (e.g., in cluster affinity scores 106) sorted by score value (step 328).

A scenario illustrating an implementation of the cluster affinity scoring technique 300 is shown and described as pertains to FIG. 4A, FIG. 4B, FIG. 4C, FIG. 4D, FIG. 4E, and FIG. 4F.

FIG. 4A, FIG. 4B, FIG. 4C, FIG. 4D, FIG. 4E, and FIG. 4F illustrate a cluster affinity scoring scenario 400 as implemented in systems that facilitate event-based clustering of collaboration entities in highly dynamic shared content environments. As an option, one or more variations of cluster affinity scoring scenario 400 or any aspect thereof may be implemented in the context of the architecture and functionality of the embodiments described herein. The cluster affinity scoring scenario 400 or any aspect thereof may be implemented in any environment.

Figure 4A:
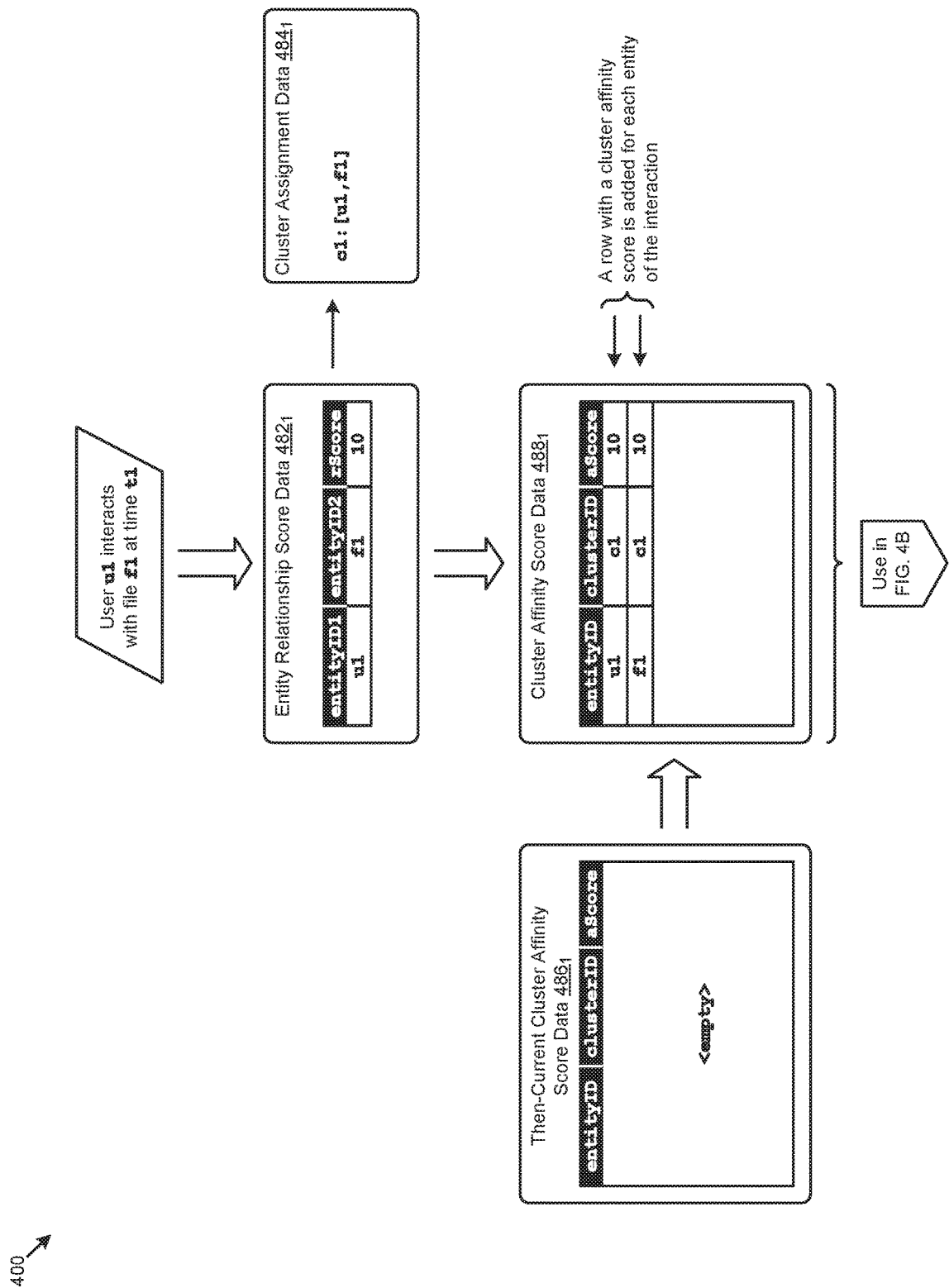
FIG. 4A, FIG. 4B, FIG. 4C, FIG. 4D, FIG. 4E, and FIG. 4F illustrate a cluster affinity scoring scenario as implemented in systems that facilitate event-based clustering of collaboration entities in highly dynamic shared content environments, according to an embodiment.

The cluster affinity scoring scenario 400 in FIG. 4A, FIG. 4B, FIG. 4C, FIG. 4D, FIG. 4E, and FIG. 4F presents a time sequence of cluster affinity score updates responsive to a corresponding time sequence of entity interaction events, according to the herein disclosed techniques. Specifically, FIG. 4A depicts an entity interaction event that pertains to user "u1" interacting with file "f1" at time "t1". The entity relationship score data $482_1$ shows the entity relationship score that is determined responsive to the event. Specifically, a "u1-f1" relationship score of "10" is presented. Further, as shown in the cluster assignment data $484_1$, user "u1" and file "f1" are assigned to a newly created cluster "c1". The foregoing information and the then-current cluster affinity score data $486_1$ (if any) are consulted to determine the cluster affinity scores shown in cluster affinity score data $488_1$. As can be observed, the then-current cluster affinity score data $486_1$ at time "t1" is "<empty>" and has no impact on the cluster affinity scoring. In this case, the cluster affinity scores for the subject entities (e.g., user "u1" and file "f1") associated with the event are set equal to the "u1-f1" entity relationship score.

The shown affinity score data $488_1$ is formed by creating a row entry for each entity of the interaction. In this particular case, there are no other entities other than user "u1" and file "f1", and thus there are no other entity combinations that would be considered for forming additional rows. The following figures depict situations where there are other entities, and thus other entity combinations that would cause additional rows to be formed and scored. More specifically, and as shown, the subject interaction event given as user "u1" interacts with file "f1" (at time t1) pertains only to entities (e.g., user "u1" and file "f1"). As such, at the earliest moment of processing the event, there were no previously formed clusters, therefore the only cluster formed via processing the event is the cluster "c1" comprising entity components user "u1" and file "f1". An affinity score for user "u1" in cluster "c1" and an affinity score for file "f1" for cluster "c1" are calculated and corresponding rows are added to the cluster affinity scores. After adding these rows, the resulting cluster affinity score data $488_1$ is stored for use when processing a new incoming event at a future time. As pertaining to the graphical representation of this FIG. 4A, the data of data cluster affinity score data $488_1$ is used in a future time period (e.g., as described in FIG. 4B). The time-spanning characteristic between FIG. 4A (pertaining to at time "t1") and FIG. 4B (pertaining to at time "t2") is depicted by the respective page connectors.

Figure 4B:
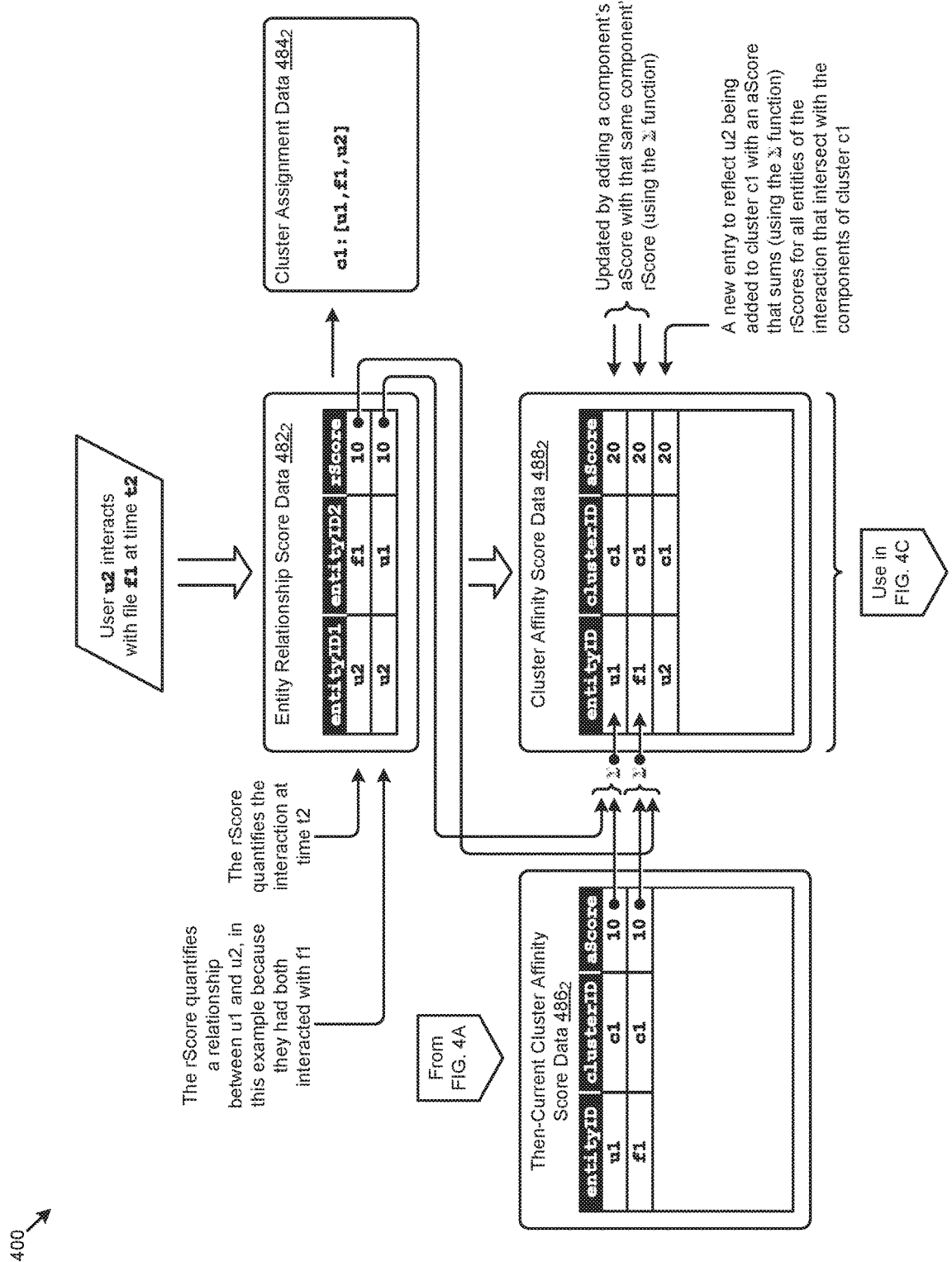

Referring to FIG. 4B, an interaction between user "u2" and file "f1" occurs at time "t2". The entity relationship score data $482_2$ shows the entity relationship scores that are determined responsive to the event. Specifically, a "u2-f1" relationship score of "10" and a "u2-u1" relationship score of "10" are presented. The "u2-u1" relationship score might represent a secondary relationship between the two users based at least in part on their mutual interaction with file "f1" and/or based at least in part on other information. Such relationship scores can be generated on-the fly as events are processed. In some situations, any number of relationship scores might be formed and stored for retrieval using a scoring service. Such a scoring service can populate and manage data structures that quantify any number of relationships between a first entity and a second entity. Relationships can be based on a particular interaction or combination of interactions involving the first entity and the second entity, and/or relationships can be based on other information, possibly involving historical interaction events involving the first entity and the second entity. Furthermore, relationships can be based one or more degrees of connectedness between any first entity and any second entity. Strictly as one example, and as shown, entity relationship score data $482_2$ includes an rScore corresponding to the entity relationship between "u2" and "f1". Also, the entity relationship score data $482_2$ includes an rScore corresponding to a relationship between "u2" and "u1", since at some point or points in time both "u2" and "u1" had interacted with file "f1".

Further details regarding general approaches to making and using a scoring service to populate and manage data structures that quantify relationships between a first entity and a second entity are described in U.S. Application Ser. No. 62/539,341 titled "EVENT-BASED COLLABORATOR RECOMMENDATIONS", filed on Jul. 31, 2017, which is hereby incorporated by reference in its entirety.

As shown in the cluster assignment data $484_2$, user "u2" is added to cluster "c1". The foregoing information and the then-current cluster affinity score data $486_2$ are consulted to determine the cluster affinity scores shown in cluster affinity score data $488_2$. As can be observed, the "u1-c1" cluster affinity score and the "f1-c1" cluster affinity score are updated from "10" to "20", based at least in part on the two active relationships they both have within cluster "c1". As shown, the "u2-c1" cluster affinity score of "20" is added to the cluster affinity score data $488_2$ due to the two relationships of user "u2" (e.g., with user "u1" and file "f1") within cluster "c1". Although the foregoing example depicts a technique for updating scores using simple addition (e.g., adding one score to another score to form an updated score), many other techniques or calculations can be applied when combining two scores to form an updated score. Strictly as examples, a first score can be time-decayed based on a time difference between the last update and the current update. Or, a first score can be associated with a weighting factor and/or a weighting function such that a previous score value is scaled by the weighting factor.

Further details regarding general approaches to time-decaying and/or weighted scores are described in U.S. Application Ser. No. 62/539,341 titled "EVENT-BASED COLLABORATOR RECOMMENDATIONS", filed on Jul. 31, 2017, which is hereby incorporated by reference in its entirety.

Figure 4C:
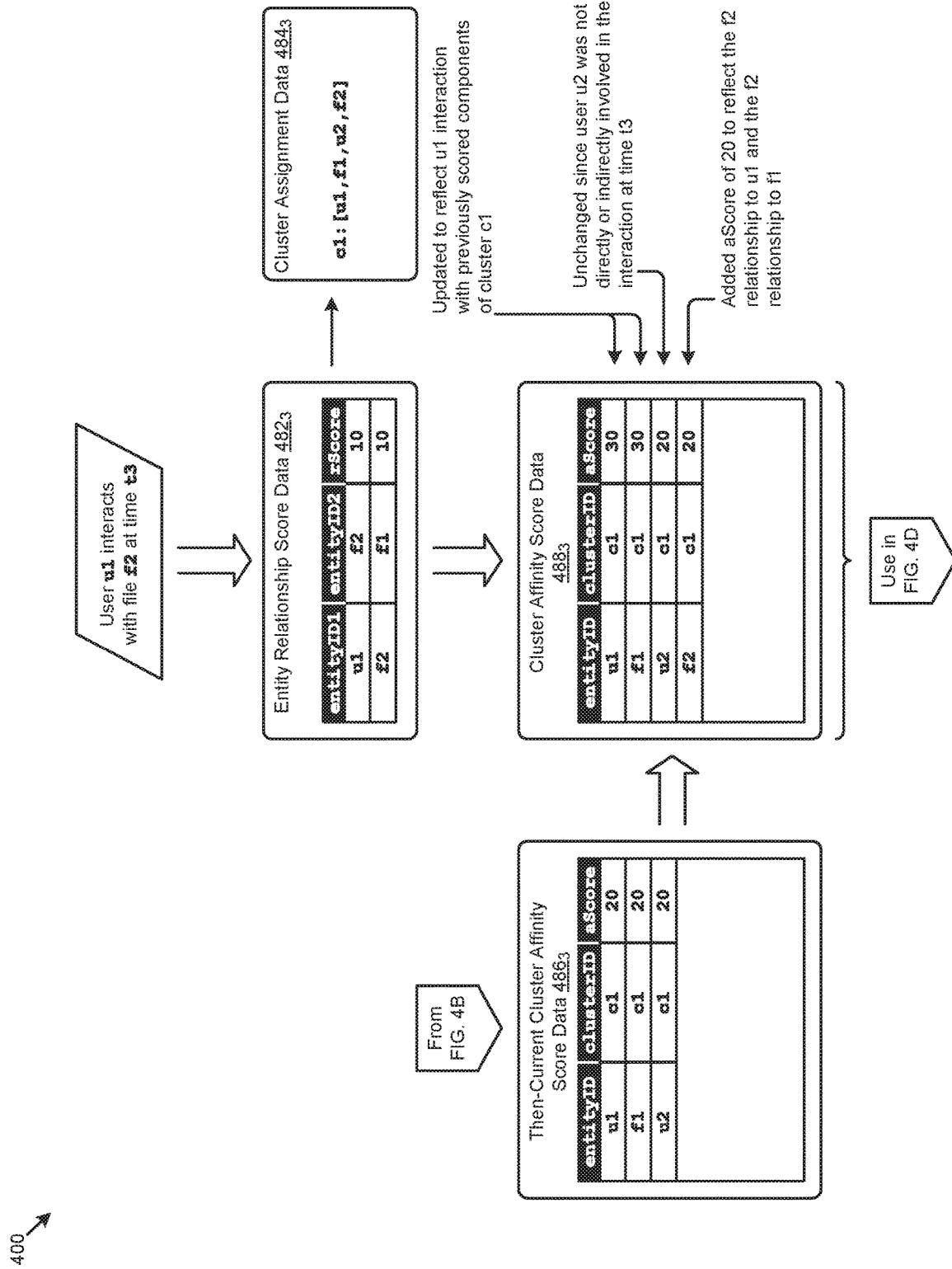

Referring to FIG. 4C, an interaction between user "u1" and file "f2" occurs at time "t3". The entity relationship score data $482_3$ shows individual entity relationship scores that are determined responsive to the event. Specifically, a "u1-f2" relationship score of "10" and a "f2-f1" relationship score of "10" are presented. The individual "f2-f1" entity combination relationship score might represent a secondary relationship between the two files based at least in part on their mutual interaction with user "u1" and/or based at least in part on other information. As shown in the cluster assignment data $484_3$, file "f2" is added to cluster "c1". The foregoing information and the then-current cluster affinity score data $486_3$ are consulted to determine the cluster affinity scores shown in cluster affinity score data $488_3$. As can be observed, the "u1-c1" cluster affinity score and the "f1-c1" cluster affinity score are updated from "20" to "30", and the "f2-c1" cluster affinity score of "20" is added to the cluster affinity score data $488_3$. At the time of processing the event of time "t3", the "u2-c1" cluster affinity score is unchanged (as shown) from its previous value since the strength of the relationship that "u2" has to cluster "c1" is unaffected by the interaction that is being processed at time "t3".

Figure 4D:
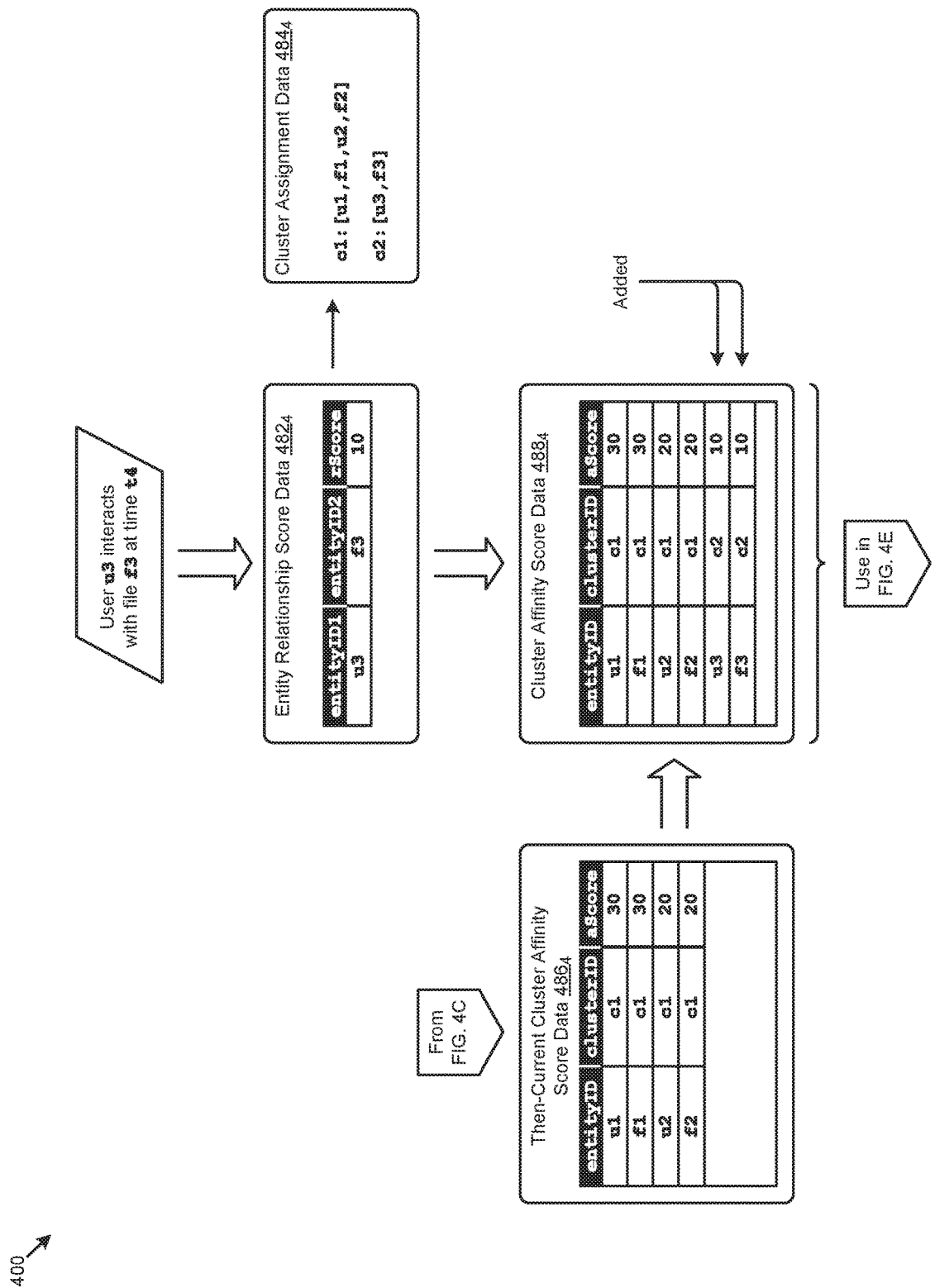

Referring to FIG. 4D, an interaction between user "u3" and file "f3" occurs at time "t4". The entity relationship score data $482_4$ shows the entity relationship score that is determined responsive to the event. Specifically, a "u3-f3" relationship score of "10" is presented. As shown in the cluster assignment data $484_4$, user "u3" and file "f3" are assigned to a newly created cluster "c2". In this case, a rulebase might be consulted to determine whether to create a new cluster for user "u3" and file "f3" and/or to add them to an existing cluster (e.g., cluster "c1"). For example, the rulebase might consult certain policy and/or site and/or enterprise information to determine that the subject entities of the entity interaction event have certain distinctions (e.g., a different physical location, a different user attribute, etc.) so as to cause the formation of a new cluster. The foregoing information and the then-current cluster affinity score data $486_4$ are consulted to determine the cluster affinity scores shown in cluster affinity score data $488_4$. As can be observed, with no entries related to cluster "c2" in the then-current cluster affinity score data $486_4$, a "u3-c2" cluster affinity score of "10" and a "f3-c2" cluster affinity score of "10" are added to the cluster affinity score data $488_4$.

Figure 4E:
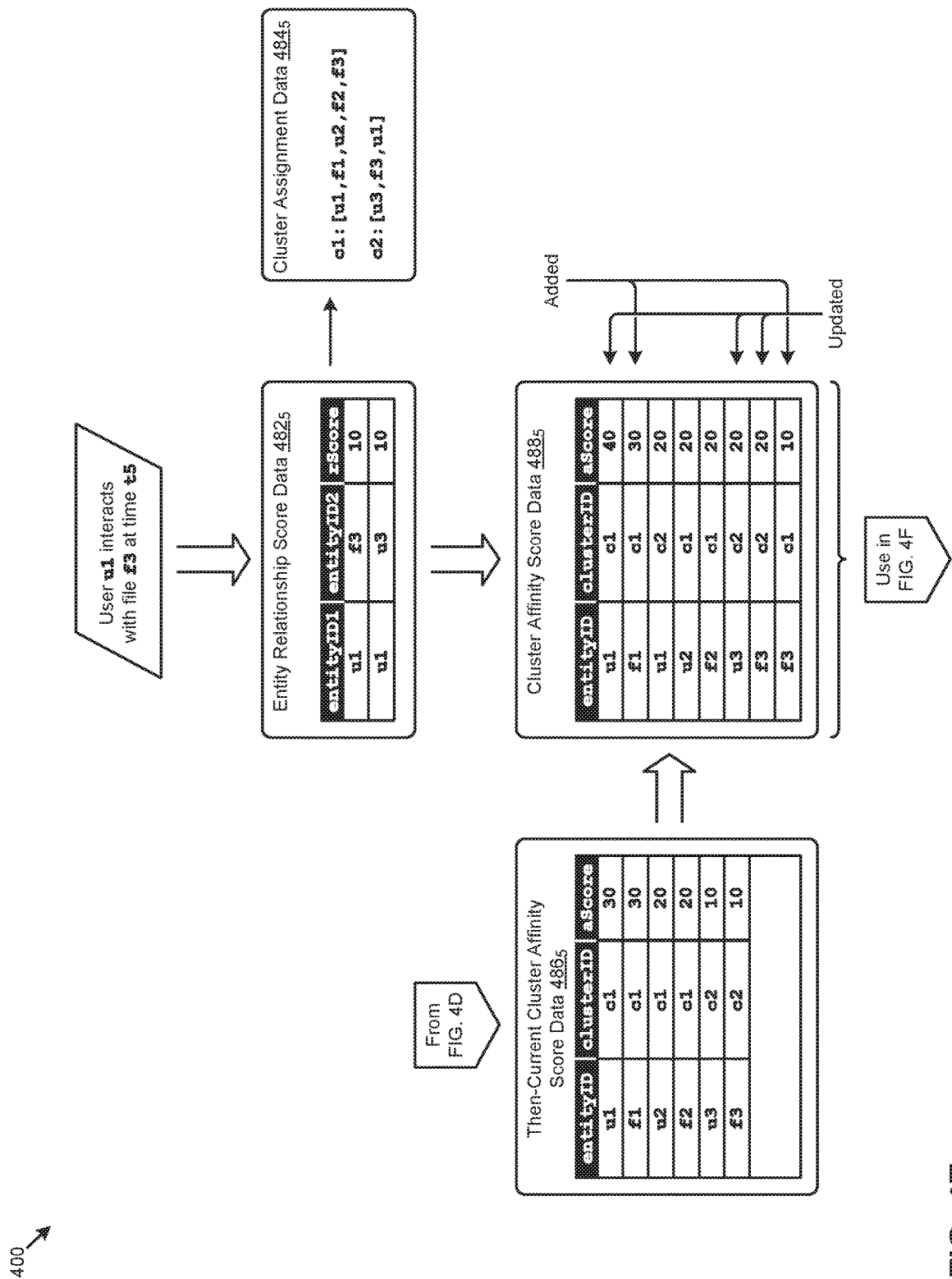

When an interaction between user "u1" and file "f3" occurs at time "t5" as shown in FIG. 4E, the entity relationship score data $482_5$ shows a "u1-f3" relationship score of "10" and a "u1-u3" relationship score of "10". The "u1-u3" relationship score might represent a secondary relationship between the two users based at least in part on their mutual interaction with file "f3" and/or based at least in part on other information. As shown in the cluster assignment data $484_5$, file "f3" is added to cluster "c1" and user "u1" is added to cluster "c2". The foregoing information and the then-current cluster affinity score data $486_5$ are consulted to determine the cluster affinity scores shown in cluster affinity score data $488_5$. As can be observed, several score additions and updates are performed. In this embodiment, the cluster affinity score data $488_5$ are ordered by decreasing scores to facilitate efficient generation of cluster affinity scores that are stored in data structures that support fast access to the highest N scores for any particular entity. A set of data structures that are populated with values from the foregoing example is given in FIG. 4F.

Figure 4F:
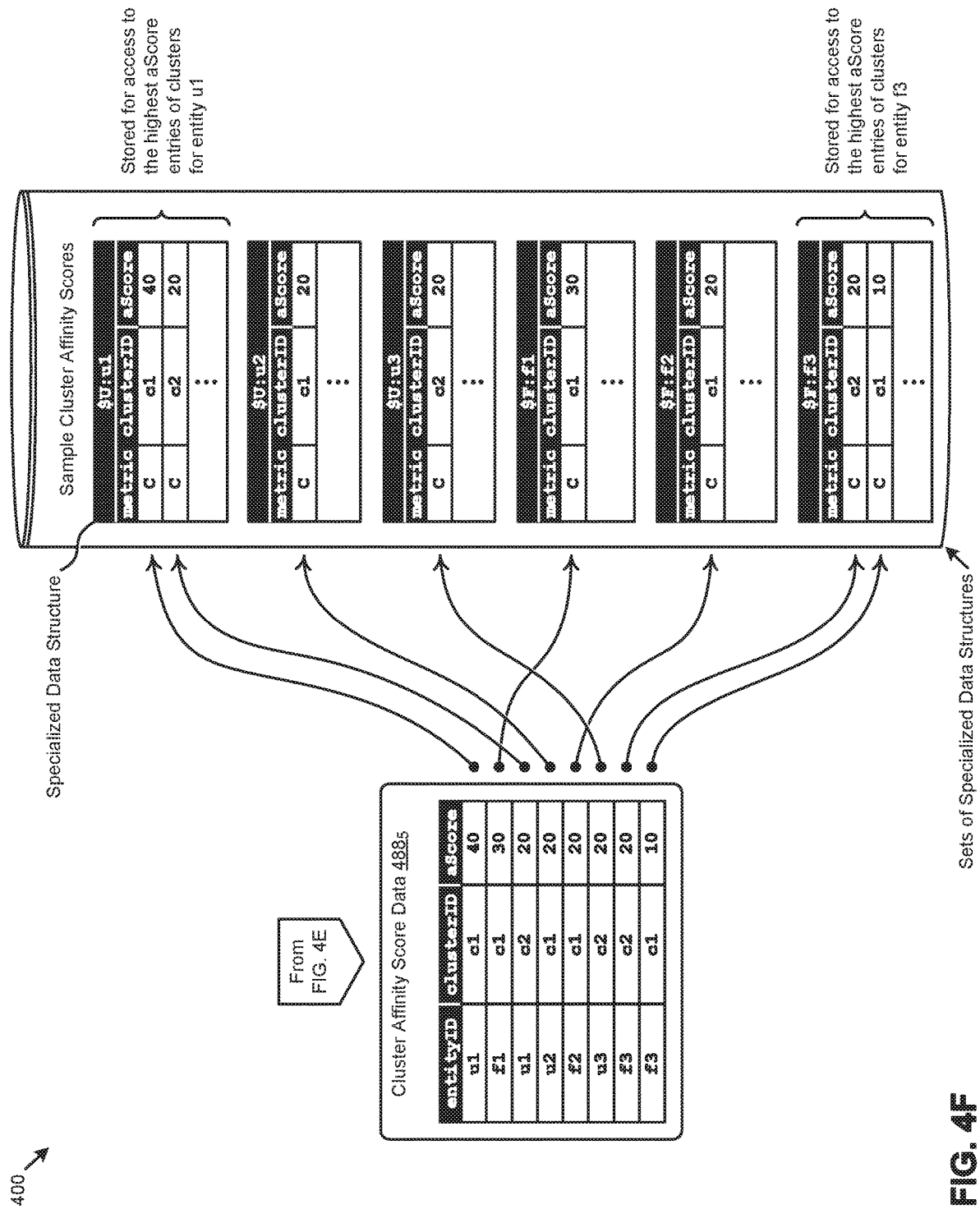

Referring to FIG. 4F, at any moment in time, the cluster affinity score data can be processed to populate specialized data structures that facilitate "topN" retrieval of scores of particular entities. In the example of FIG. 4F, the sample cluster affinity scores includes six data structures, one for each of six unique entities (shown as "u1", "u2", "u3", "f1", "f2", and "f3"). The top (e.g., highest valued) aScore values for the particular entity can be retrieved from the data structure (e.g., using a "topN" retrieval technique).

More particularly, independently accessible sets of cluster affinity scores are stored for fast access to the highest scores such that the topN clusters pertaining to a particular entity can be retrieved expeditiously. The data structure is populated over time such that only the top (e.g., highest valued) aScores are retained in the data structure. The number of top cluster scores to be held in such a specialized data structure can be established in a configuration step. When one of these specialized data structure is filled, and when a higher top score is a candidate for entry, the entry holding the smallest cluster aScore is removed from the specialized data structure and the higher scoring candidate is entered into the specialized data structure. Retrieval of the top cluster affinity scores for a particular entity can be by means of a linked list, or a doubly-linked list, or an ordered list, or any by any known technique for retrieving a set of top scoring entries.

Strictly for illustrative purposes, the example of FIG. 4F shows how each of the entries of the cluster affinity score data $488_5$ are copied to or referenced in a corresponding specialized data structure of the cluster affinity scores that pertains to the particular entry derived from the cluster affinity score data $488_5$.

As can be seen in the illustrations of FIG. 4A through FIG. 4F, the cluster sizes (e.g., number constituents in the clusters) are monotonically increasing. The aScores that correspond to the constituents of a cluster increase monotonically as well. However, in many practical embodiments, the scores of a cluster's constituents can be decayed with the passage of time. In one scenario, rScores are subjected to a decay function beginning when the cluster is created and throughout the passage of time until the constituent rScores decay to a value that is close enough to zero that such decayed rScores can be deemed to be zero and thus, the corresponding entries in the cluster can be deleted. If and when all entries in a particular cluster have been deleted, the cluster itself can be deleted.

As relationships decay, a particular cluster might no longer rise to the top N, however when a new event precipitates a new relationship that is in some way related to the entities of the cluster, processing of the event can add value to any of the relationships of the cluster and thus, it might again be brought into the top N.

Figure 5A:
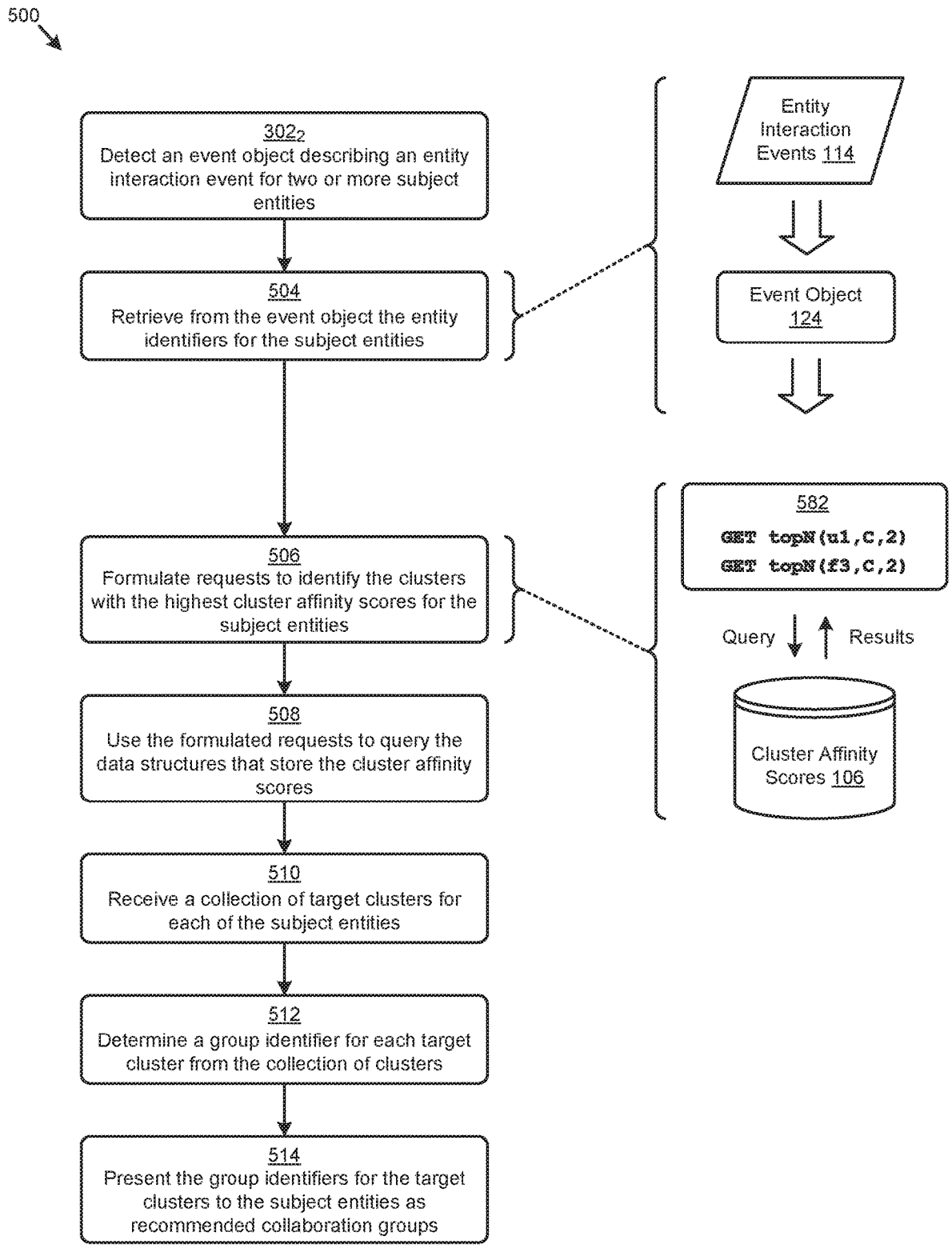
FIG. 5A and FIG. 5B present a collaboration group identification technique as implemented in systems that facilitate event-based clustering of collaboration entities in highly dynamic shared content environments, according to an embodiment.
Figure 5B:
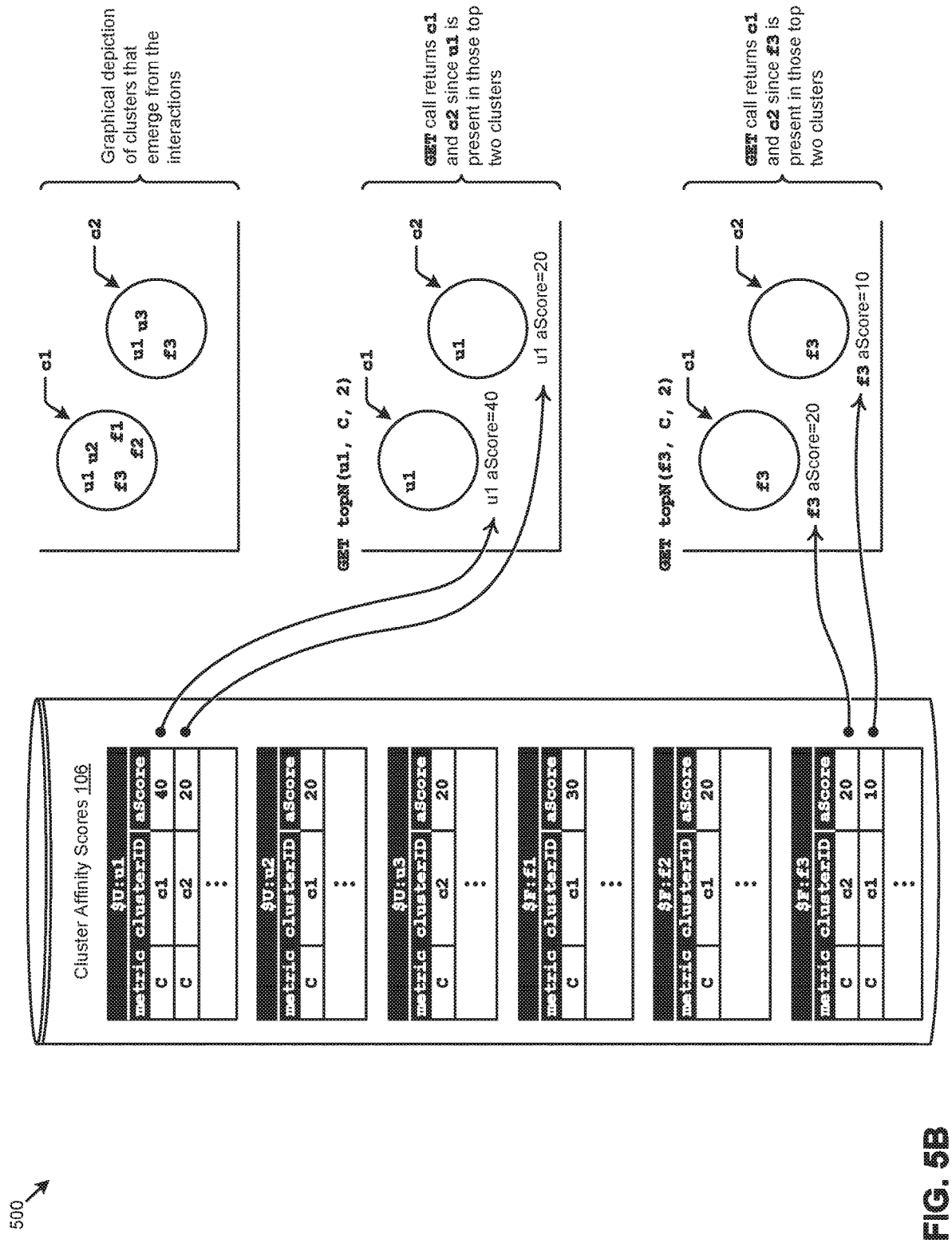

Further embodiments for using the foregoing cluster affinity score data and specialized data structures of the cluster affinity scores to identify collaboration groups are presented and discussed as pertains to FIG. 5A and FIG. 5B.

FIG. 5A and FIG. 5B present a collaboration group identification technique 500 as implemented in systems that facilitate event-based clustering of collaboration entities in highly dynamic shared content environments. As an option, one or more variations of collaboration group identification technique 500 or any aspect thereof may be implemented in the context of the architecture and functionality of the embodiments described herein. The collaboration group identification technique 500 or any aspect thereof may be implemented in any environment.

The collaboration group identification technique 500 presents one embodiment of certain steps and/or operations that identify collaboration groups using event-based clustering of collaboration entities in highly dynamic shared content environments. Various illustrations are also presented to illustrate the collaboration group identification technique 500.

As shown, the collaboration group identification technique 500 can commence by detecting an event object that describes an entity interaction event associated with two or more subject entities (step 3022). For example, and as illustrated, an event object 124 that is generated in response to one or more of the entity interaction events 114 (e.g., a user "u1" interacts with a file "f1") might be detected. The entity identifiers for the subject entities associated with the entity interaction event are retrieved from the event object (step 504). Using the entity identifiers and/or other information, various requests are formulated to identify the clusters with the highest cluster affinity scores for the subject entities (step 506). As depicted in the representative examples in operation 582, one request (e.g., "GET topN (u1,C,2)") might be formulated to identify the top two clusters (e.g., "metric=C") to which user "u1" is most strongly related, while another request (e.g., "GET topN(f3, C,2)") might be formulated to identify the top two clusters (e.g., "metric=C") to which file "f3" is most strongly related.

These requests are issued as queries to the data structure storing the cluster affinity scores (step 508). For example, in certain embodiments, the requests might be issued to operate over a set of cluster affinity scores 106 stored in a key-value data structure in order of decreasing score value. As such, the formulated requests can specify the keys of the key-value store to scan to identify the list of clusters. More specifically, a first portion of the key (e.g., partition key) can point to the partition storing the target set of scores (e.g., for user "u1", file "f1", etc.), a second portion of the key (e.g., sort key) can point to the ordered sequence of entries, and a third portion of the key (e.g., key suffix) can comprise results (e.g., "clusterID") to be returned. The foregoing example is further shown and described as pertains to FIG. 5B.

Responsive to issuing the requests, a collection of the target clusters (e.g., identified by cluster identifiers) for each of the subject entities are received (step 510). In certain embodiments, a group identifier (e.g., human-readable label)

is determined for each target cluster (step 512). The group identifiers for the collection of target clusters are presented to the respective subject entities as recommended collaboration groups (step 514). For example, one or more of the collaboration group recommendations 132 might be presented to a user in response to an interaction event involving the user.

The aforementioned group identifier (e.g., label) can be formed based at least in part on aspects of a file name, and/or based at least in part on aspects of a folder name, and/or based at least in part on some aspect of the file contents, and/or based at least in part on aspects of user names, and/or based at least in part on aspects of user role or department, and/or based at least in part on a frequency relationship to an event or events that pertain to any of the foregoing aspects, etc.

Returning to the discussion of step 508 in FIG. 5A, the depiction of FIG. 5B exemplifies how the foregoing cluster affinity scores can be stored in data structures to facilitate retrieval of the top scoring cluster sets that pertain to any given entity. More specifically, and as shown, FIG. 5B depicts how cluster affinity scores are stored so as to facilitate identification of entity-specific cluster sets that pertain to entity "u1", entity-specific cluster sets that pertain to entity "u2", entity-specific cluster sets that pertain to entity "u3", entity-specific cluster sets that pertain to entity "f1", entity-specific cluster sets that pertain to entity "f2", and entity-specific cluster sets that pertain to entity "f3". As shown, a "topN" retrieval function (e.g., "topN(u1,C,2)") specifies a particular entity (e.g., "u1") and an indication that the top two clusters are to be returned (e.g., as depicted by the metric parameter "c" and third parameter value being "2"). The "topN" retrieval function might specify any entity, such as "f3". The top valued clusters that pertain to the given entity are returned.

As shown, there are separate cluster scores for every entity/cluster combination. In this example, there is a cluster score (e.g., "40") for entity "u1" as pertains to its presence in cluster "c1", and a separate cluster score (e.g., "20") for entity "u1" as pertains to its presence in cluster "c2". Continuing, there is a cluster score (e.g., "20") for entity "f3" as pertains to its presence in cluster "c1", and a separate cluster score (e.g., "10") for entity "f3", as pertains to its presence in cluster "c2".

Using the foregoing techniques for retrieval of pertinent clusters, up-to-date collaboration groups that are pertinent to any entity can be identified at any moment in time. A scenario illustrating an implementation of the collaboration group identification technique 500 is shown and described as pertains to FIG. 6.

FIG. 6 depicts a collaboration group identification scenario 600 as implemented in systems that perform event-based clustering of collaboration entities in highly dynamic shared content environments. As an option, one or more variations of collaboration group identification scenario 600 or any aspect thereof may be implemented in the context of the architecture and functionality of the embodiments described herein. The collaboration group identification scenario 600 or any aspect thereof may be implemented in any environment.

The collaboration group identification scenario 600 shown in FIG. 6 depicts merely one representative set of data structures that can be efficiently accessed to identify collaboration groups in real time responsive to entity interaction events. Specifically, FIG. 6 depicts a set of representative data structures to store the cluster affinity scores 106. A representative data structure for storing other affinity scores (e.g., entity affinity scores 606) is also shown. While the data structures are visually tabular, they can represent a key-value store such as earlier described. Specifically, each data structure can represent a key-value store partition that is referenced by an "entityType" and "entityID" (e.g., "$U: u1"). Further, the entries (e.g., rows) can have monotonically increasing keys (e.g., sort keys) comprising a "metric" (e.g., "c" for cluster affinity score, "F" for file affinity score, etc.) and a "time" the entry is written. A key suffix (e.g., "clusterID", "fileID", etc.) and the value corresponding to the row key (e.g., "ascore") is also included in the data structures. According to the herein disclosed techniques, the cluster affinity scores 106 and the entity affinity scores 606 can be stored in their respective data structures sorted by score value (step 628 and step 630, respectively).

The collaboration group identification scenario 600 further depicts example requests and corresponding responses that operate over the foregoing data structures. Specifically, a request 682$_1$ (e.g., "topN(u1,C,3)") is directed to the "$U:u1" partition to retrieve the top "3" clusters. A result 684$_1$ comprising the clusters "[c8,c2,c3]" is returned. Also, a request 682$_2$ (e.g., "topN(u2,C,2)") is directed to the "$U:u2" partition to retrieve the top "2" clusters. A result 684$_2$ comprising the clusters "[c7,c2]" is returned. Further, a request 682$_3$ (e.g., "all(f1,C)") is directed to the "$F:f1" partition to retrieve the all of the clusters comprising file "f1". A result 684$_3$ comprising the clusters "[c2, c8, c3, . . . ]" is returned. As another example, a request 682$_4$ (e.g., "topN(u3,F,3)") is directed to the "$U:u3" partition to retrieve the top "3" files associated with user "u3". A result 684$_4$ comprising the files "[f2,f4,f7]" is returned.

In some cases, the foregoing results can be used to present recommended collaboration groups to certain entities (e.g., users). Example user interface views showing such collaboration group recommendations is shown and described as pertains to FIG. 7A. Many other uses cases are possible, some of which are shown and described as pertains to FIG. 7B.

Figure 7A:
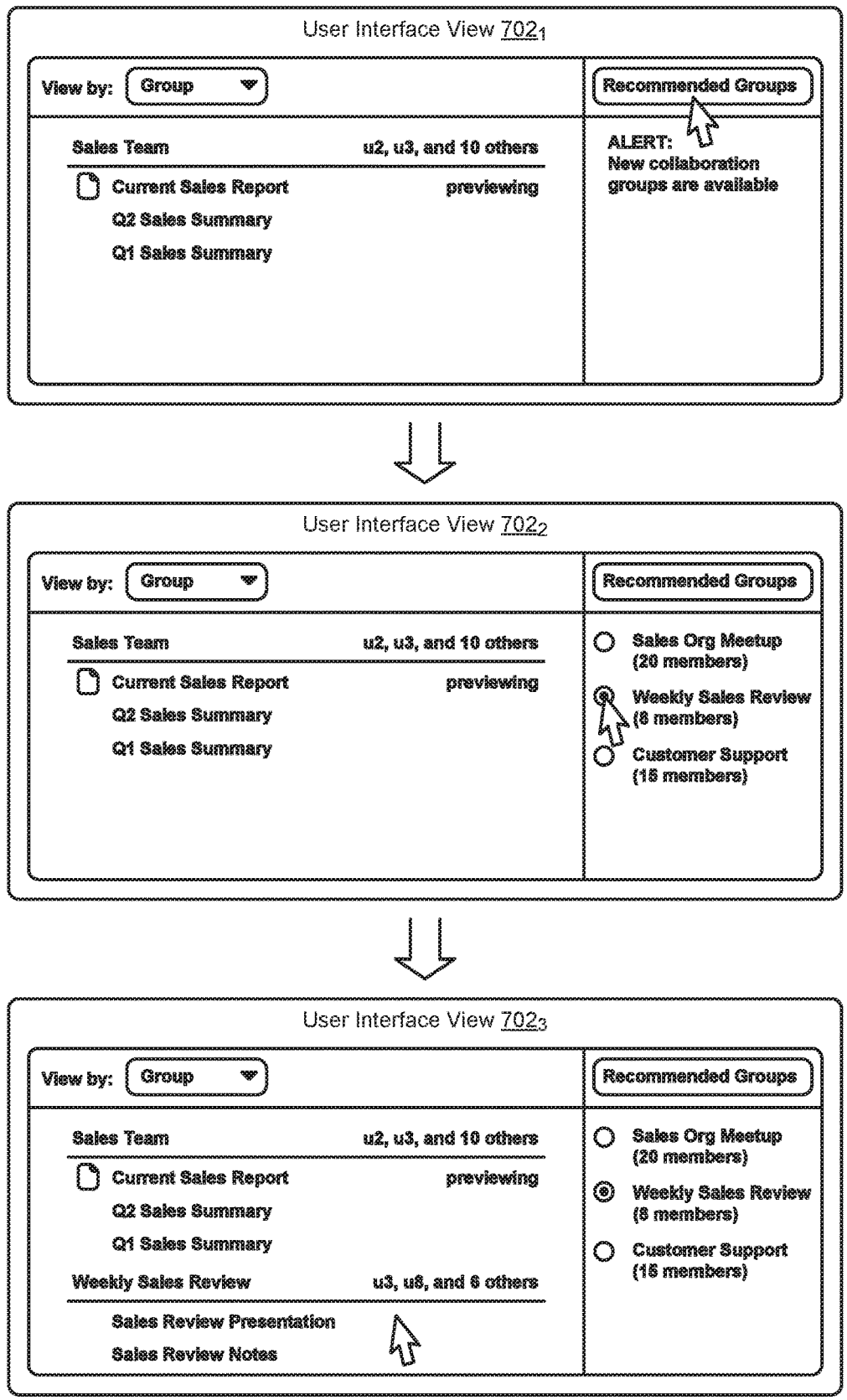
FIG. 7A and FIG. 7B depict user interaction scenarios that display recommended collaboration groups in systems that perform event-based clustering of collaboration entities in highly dynamic shared content environments, according to an embodiment.
Figure 7B:
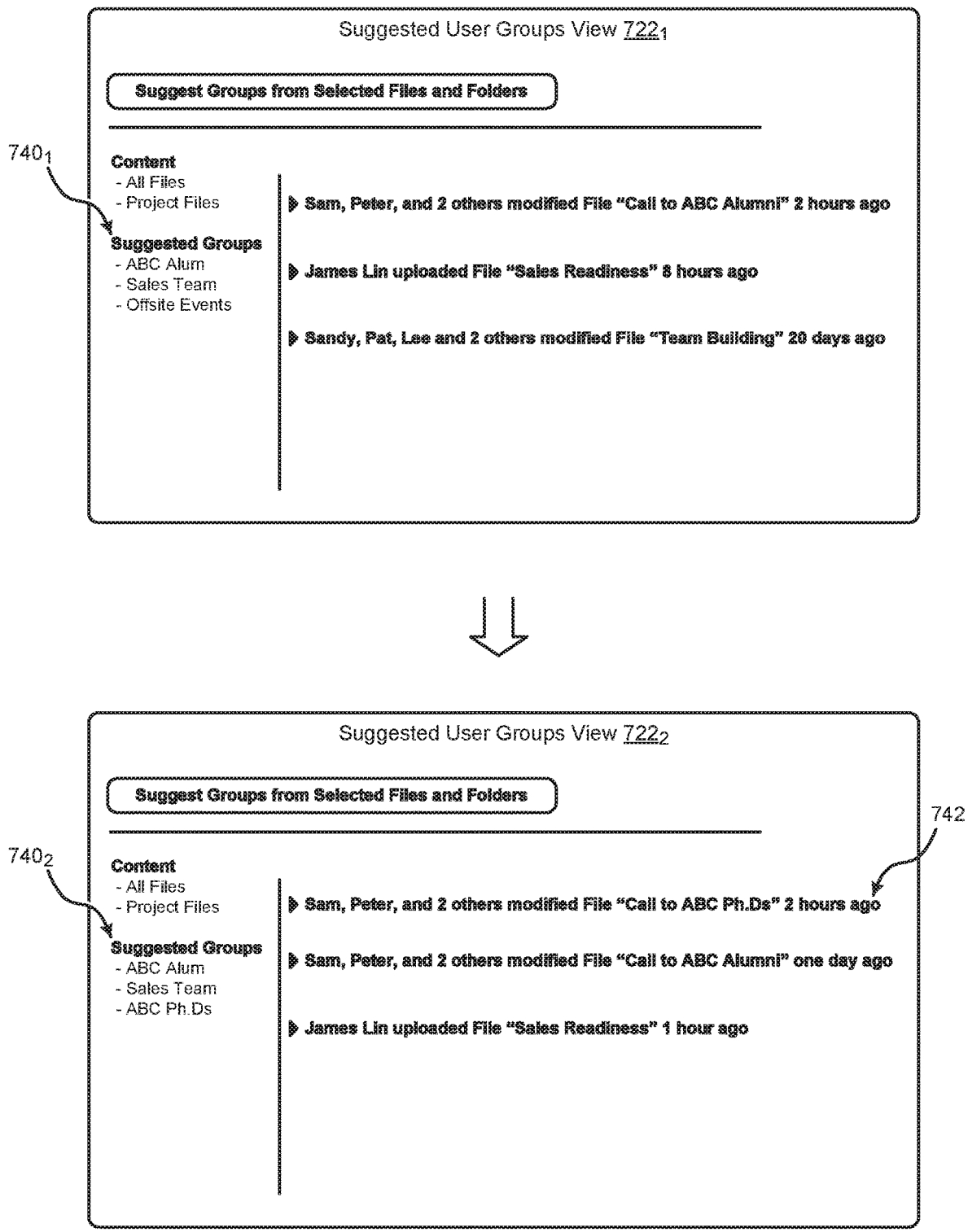

FIG. 7A and FIG. 7B depict user interaction scenarios that display recommended collaboration groups in systems that perform event-based clustering of collaboration entities in highly dynamic shared content environments. As an option, one or more variations of the user interaction scenarios or any aspect thereof may be implemented in the context of the architecture and functionality of the embodiments described herein. The user interaction scenarios or any aspect thereof may be implemented in any environment.

The user interaction scenario of FIG. 7A presents various user interface views to illustrate a user interaction with systems that perform event-based clustering of collaboration entities in highly dynamic shared content environments. Specifically, a user interface view 702$_1$ indicates that a user might view certain accessible content objects (e.g., a file named "Current Sales Report", a file named "Q2 Sales Summary, and a file named "Q1 Sales Summary"). As shown, these files can be organized for display by collaboration "Group" (e.g., a "Sales Team" group). Responsive to a particular entity interaction event (e.g., the user is "previewing" file "Current Sales Report") an alert might be presented to indicate new (or previously existing) collaboration groups are recommended for the user. If the user clicks the "Recommended Groups" button, a list of recommended collaboration groups is displayed as shown in user interface view 702$_2$. In accordance with the herein disclosed techniques, the shown recommendations can be derived from the top three clusters having the highest cluster affinity scores. Further, data pertaining to the cluster assignments can be consulted to display the number of group members (e.g., users) as shown. If the user selects one or more of the groups (e.g., group "Weekly Sales Review"), details pertaining to that collaboration group will be presented as shown in user interface view $702_3$. Specifically, the entities (e.g., users, files, etc.) assigned to that collaboration group are displayed in a human-readable format.

The foregoing depicts merely one usage scenario in an enterprise setting. Other use cases are supported by the disclosed techniques. Strictly as one example, and as shown in FIG. 7B, a user interface dashboard comprising a screen device (e.g., a window, or a panel, or a drawer menu, or an iFrame, etc.) provides a listing that lists named sets of dynamically-updated collaborative groups of users. The named collaborative groups of users can serve as an entry point (e.g., a hyperlink) for access to additional information pertaining to the named collaborative group. Strictly as an example, the shown suggested user groups view $722_1$ includes a first set of suggested groups $740_1$ (e.g., "ABC Alum" group, "Sales Team" group, and "Offsite Events" group). The makeup of the suggested groups can be dynamically determined based at least in part on ongoing changing events and/or conditions pertaining to the selected files and folders (e.g., "All Files" of the user, or just "Project Files" of the user). More specifically, the herein-disclosed techniques for real-time constituent scoring results in dynamically-generated collaboration groups, which dynamically-generated collaboration groups are updated via one or more feeds so as to remain relevant as time progresses. Moreover, the names of the suggested groups can be determined from dominating characteristics that appear in the contents of the constituents of a corresponding suggested group. In some cases, a display name of a suggested group can be found in metadata pertaining to a determined suggested group. For example, if a large percentage of the users in a particular cluster 'C' are collaborators in a particular named collaboration group, then the name of that collaboration group can be retrieved from metadata pertaining to that group. In other situations, the display name of a suggested group might be derived from the name of a file over which there is a preponderance of activity. Further, in some cases, portions of a file's hierarchical path name can be used in forming the display name. In still other situations, the display name of a suggested group might be derived from the name of a particular user over which there is a preponderance of activity. In some cases, portions of the contents of that user's metadata might be combined with the user name to form a suggested group name.

In the example of FIG. 7B, the first set of suggested groups $740_1$ comprising "ABC Alum" group, "Sales Team" group, and "Offsite Events" group is displayed at some time "T=T0". However, during the time interval between T0 and a later time, such as "T=T0+1 day" there may have been many intervening events, which events may have influenced the constituency of the groups, and/or may have precipitated the formation of new groups. Moreover, during the time interval between T0 and sometime later, such as "T=T0+1 day", the scores that were used in forming collaboration groups and or the scores used in ranking (e.g., top N) groups may have been time-decayed based on the time difference.

Continuing this example, and as shown, a second set of suggested groups $740_2$ comprises "ABC Alum" group, "Sales Team" group, and "ABC Ph.Ds" as of "time=T0+1 day". Some of the events that brought about the differences between the first set of suggested groups $740_1$ and the second set of suggested groups $740_2$ are depicted. Specifically, one event that precipitated the formation of the new collaboration group "ABC Ph.Ds" is shown as entry 742, which is displayed as "Sam, Peter, and 2 others modified File "Call to ABC Ph.Ds" 2 hours ago". Also in this example, the events displayed in suggested user groups view $722_1$ as "Sandy, Pat, Lee and 2 others modified File "Team Building" 20 days ago" do not show up in suggested user groups view $722_2$ since the scoring of those events had decayed beyond a threshold (e.g., 20 days). The dynamic nature of forming collaboration groups is such that some collaboration groups can grow to comprise a large number of members. However, due to time-decaying scores, even though the number of members might have become large at one moment in time, that collaboration group might not ever reach or remain in the top N groups.

Any one or more of the entries of the suggested groups can serve as a handle (e.g., HTML link) to a repository for detailed information coming from a feed. A feed can include any of a variety of observable collaboration events that occur by or between members of the corresponding collaboration group and/or by or between any member and any collaboration entity. For example, a feed can be instructed to post an entry in correspondence with a subject collaboration group whenever one member of the collaboration group accesses a file that is shared by any other member of the same collaboration group. Users can subscribe to such feeds, and can configure display and/or suppression of entries and/or alerts that might be raised upon detection of a collaboration event.

Additional use cases include situations where a "seed" cluster is provided to the collaboration recommendation service, and/or use cases where clusters are formed and delivered to members of spontaneously formed groups of users (e.g., users who are members of a spontaneously formed "social" or "personal area" network). The type of event and/or corresponding weight and/or corresponding scoring and/or time decay can be calibrated such that such certain spontaneously formed groups of users might decay more rapidly than other spontaneously formed groups of users. In particular, spontaneously formed groups of users and/or the scores of corresponding constituent users can decay quickly to a zero value and then be deleted or otherwise be marked as no longer interesting.

Figure 8:
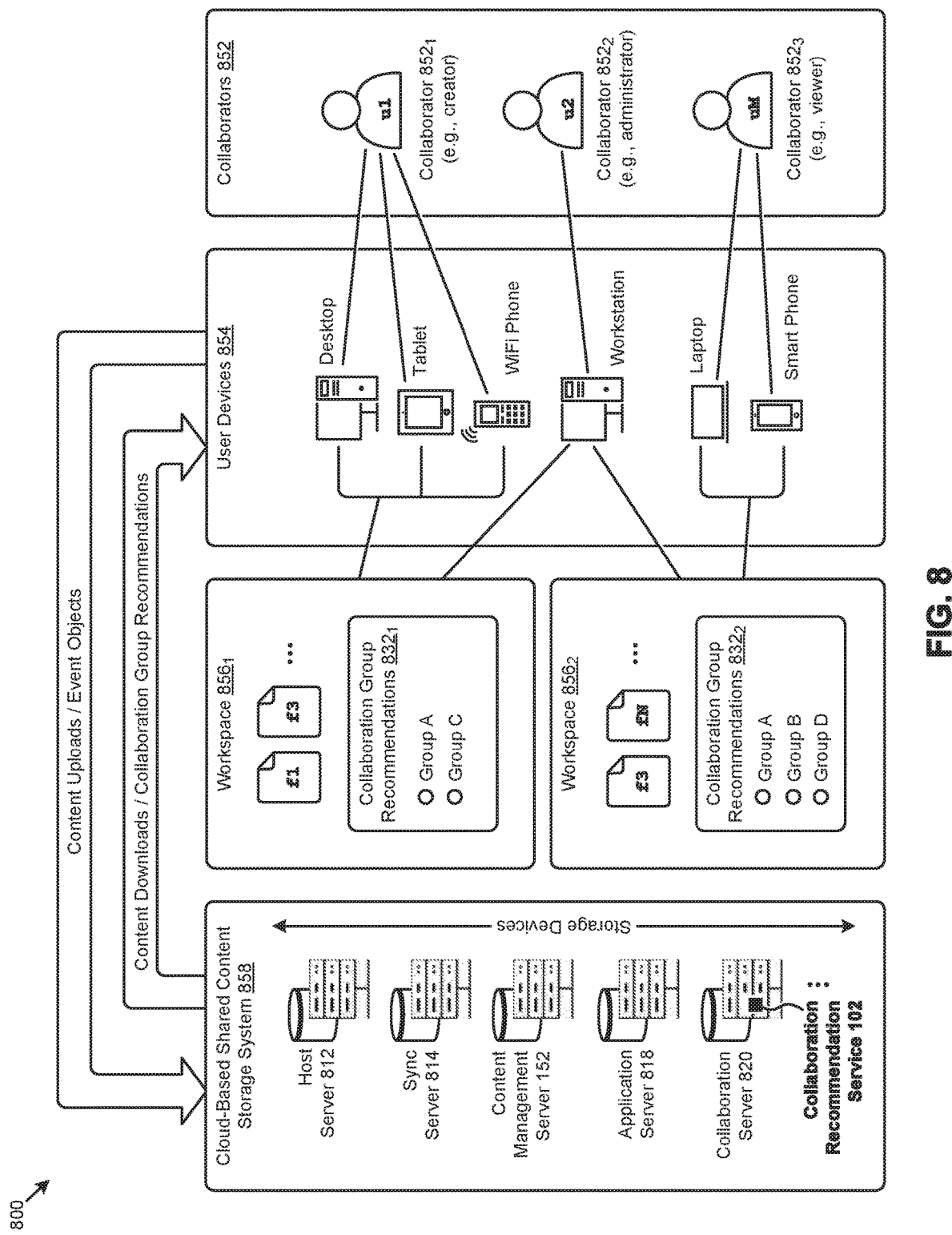
FIG. 8 depicts a cloud-based environment suitable for implementing event-based clustering of collaboration entities in highly dynamic shared content environments, according to an embodiment.

An implementation of the herein disclosed techniques in a cloud-based environment is described and shown as pertaining to FIG. 8.

FIG. 8 depicts a cloud-based environment 800 suitable for implementing event-based clustering of collaboration entities in highly dynamic shared content environments. As an option, one or more variations of cloud-based environment 800 or any aspect thereof may be implemented in the context of the architecture and functionality of the embodiments described herein. The cloud-based environment 800 or any aspect thereof may be implemented in any environment.

As shown in FIG. 8, certain users (e.g., collaborators 852) having various collaboration roles (e.g., creator, editor, administrator, approver, auditor, reviewer, etc.) can use one or more instances of user devices 854 to interact with one or more workspaces (e.g., workspace $856_1$, workspace $856_2$, etc.) facilitated by a cloud-based shared content storage system 858 in the cloud-based environment 800. As an example, collaborator $852_1$ might be a content creator (e.g., identified as user "u1") with access to workspace $856_1$, collaborator $852_3$ might be a content viewer (e.g., identified as user "uM") with access to workspace $856_2$, and collaborator $852_2$ might be an administrator (e.g., identified as user "u2") with access to both workspaces. The workspaces can be stored in any location, and are at least partially maintained by components within the cloud-based shared content storage system 858. The cloud-based shared content storage system 858 supports any variety of processing elements and/or servers, such as a host server 812, a sync server 814, a content management server 152, an application server 818, a collaboration server 820 comprising an instance of the collaboration recommendation service 102, and/or other processing elements. The cloud-based shared content storage system 858 further facilitates access by the foregoing processing elements to any variety of storage devices.

Any of the users can be provisioned authorized access to various portions the content objects stored in the storage devices without the additional process of manually downloading and storing a file locally on an instance of the user devices 854 (e.g., a desktop computer, a tablet, a WiFi phone, a workstation, a laptop computer, a smart phone, etc.). For example, one of the content objects (e.g., file "f3") created and uploaded by collaborator $852_1$ might be viewed by collaborator $852_3$ without informing the collaborator $852_3$ where the file is physically stored in the storage devices of the cloud-based shared content storage system 858. Such a facility streamlines the frequently repeated sharing and/or collaboration processes. More specifically, the aforementioned workspaces can facilitate event-based clustering of collaboration entities (e.g., users, files, etc.) to present collaboration group recommendations. For example, collaborator $852_1$ (e.g., user "u1") might interact with file "f1", file "f3", and other files in workspace $856_1$, while collaborator $852_3$ (e.g., user "uM") might interact with file "f3", file "fN", and other files in workspace $856_2$. According to the herein disclosed techniques, such interactions can invoke entity interaction events described by event objects that are processed to issue various collaboration group recommendations to the users. Specifically, as shown, a set of issued collaboration group recommendations $832_1$ that comprise "Group A" and "Group C" are presented to user "u1" in workspace $856_1$, and a set of issued collaboration group recommendations $832_2$ that comprise "Group A", "Group B", and "Group D" are presented to user "uM" in workspace $856_2$.

ADDITIONAL EMBODIMENTS OF THE DISCLOSURE

Additional Practical Application Examples

Figure 9:
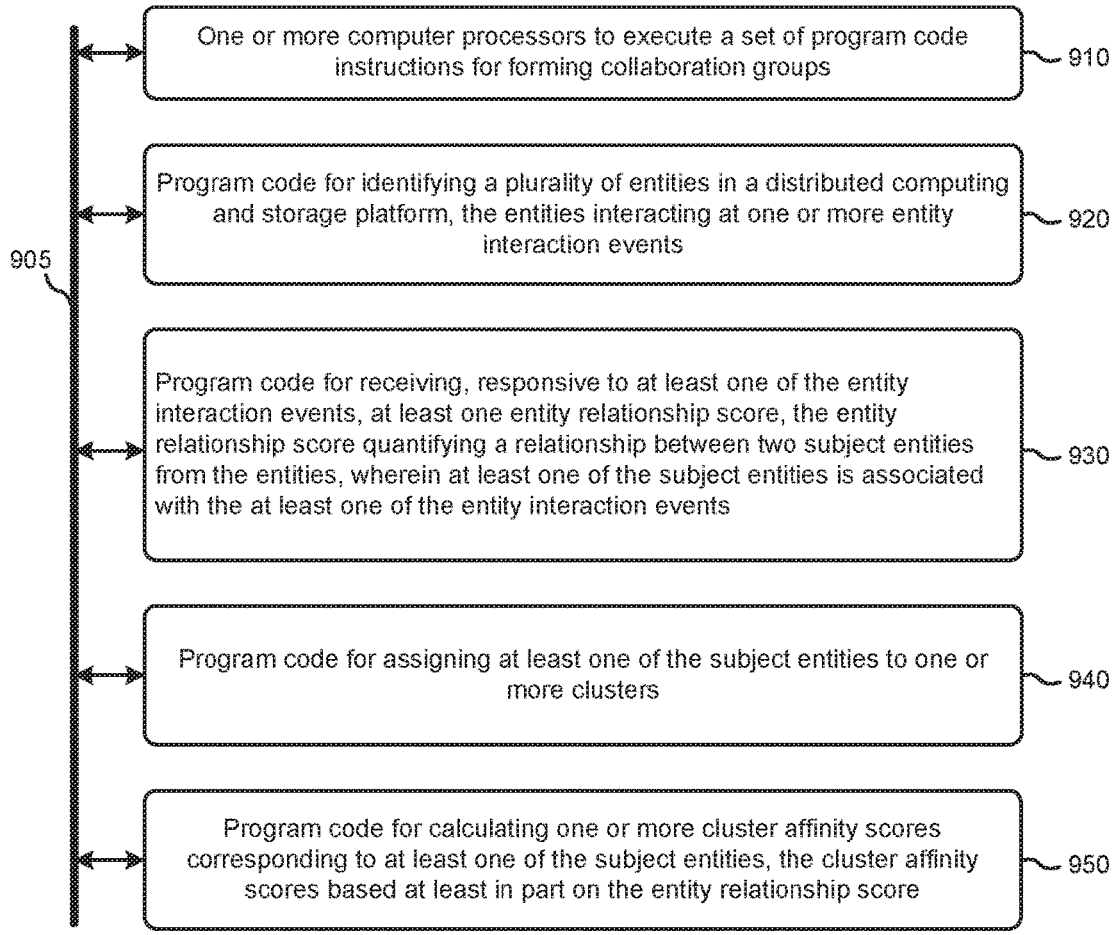
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address real-time identification and scoring of collaboration groups that remain relevant as time progresses. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: identifying a plurality of entities in a distributed computing and storage platform, the entities interacting at one or more entity interaction events (module 920); receiving, responsive to at least one of the entity interaction events, at least one entity relationship score, the entity relationship score quantifying a relationship between two subject entities from the entities, wherein at least one of the subject entities is associated with the at least one of the entity interaction events (module 930); assigning at least one of the subject entities to one or more clusters (module 940); and calculating one or more cluster affinity scores corresponding to at least one of the subject entities, the cluster affinity scores based at least in part on the entity relationship score (module 950).

Variations of the foregoing may include more or fewer of the shown modules. Certain variations may perform more or fewer (or different) steps, and/or certain variations may use data elements in more, or in fewer (or different) operations.

SYSTEM ARCHITECTURE OVERVIEW

Additional System Architecture Examples

Figure 10A:
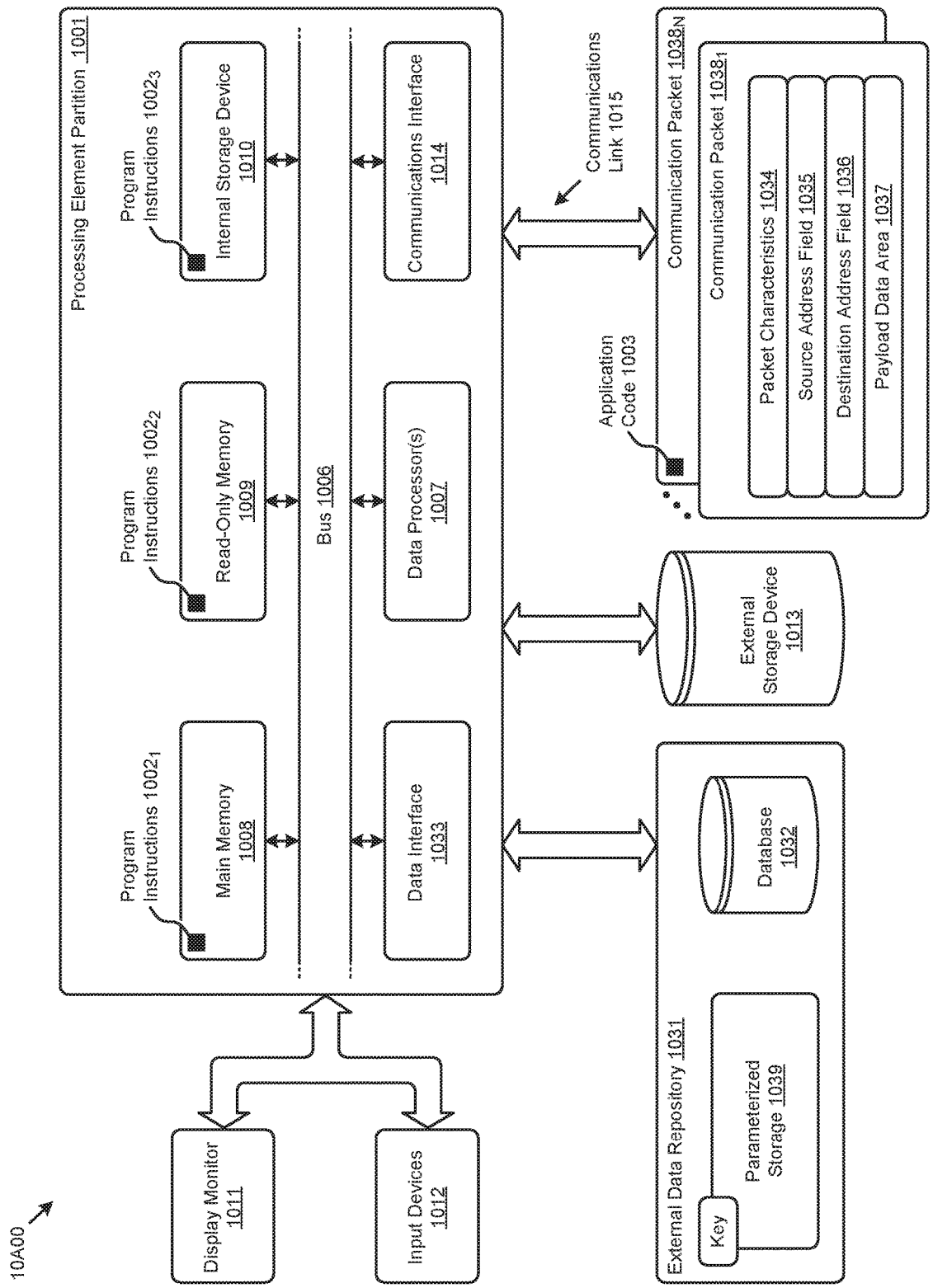
FIG. 10A and FIG. 10B present block diagrams of computer system architectures having components suitable for implementing embodiments of the present disclosure, and/or for use in the herein-described environments.

FIG. 10A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a central processing unit (CPU), or a multi-core CPU (e.g., data processor 1007), a system memory (e.g., main memory 1008, or an area of random access memory (RAM)), a non-volatile storage device or non-volatile storage area (e.g., read-only memory 1009), an internal storage device 1010 or external storage device 1013 (e.g., magnetic or optical), a data interface 1033, a communications interface 1014 (e.g., PHY, MAC, Ethernet interface, modem, etc.). The aforementioned components are shown within processing element partition 1001, however other partitions are possible. Computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by data processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 10A00 performs specific networking operations using one or more instances of communications interface 1014. Instances of communications interface 1014 may comprise one or more networking ports that are configurable (e.g., pertaining to speed, protocol, physical layer characteristics, media access characteristics, etc.) and any particular instance of communications interface 1014 or port thereto can be configured differently from any other particular instance. Portions of a communication protocol can be carried out in whole or in part by any instance of communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as data processor 1007.

Communications link 1015 can be configured to transmit (e.g., send, receive, signal, etc.) any types of communications packets (e.g., communication packet $1038_1$, communication packet $1038_N$) comprising any organization of data items. The data items can comprise a payload data area 1037, a destination address 1036 (e.g., a destination IP address), a source address 1035 (e.g., a source IP address), and can include various encodings or formatting of bit fields to populate packet characteristics 1034. In some cases, the packet characteristics include a version identifier, a packet or payload length, a traffic class, a flow label, etc. In some cases, payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1007 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of a computer system 10A00. According to certain embodiments of the disclosure, two or more instances of computer system 10A00 coupled by a communications link 1015 (e.g., LAN, public switched telephone network, or wireless network) may perform the sequence of instructions required to practice embodiments of the disclosure using two or more instances of components of computer system 10A00.

Computer system 10A00 may transmit and receive messages such as data and/or instructions organized into a data structure (e.g., communications packets). The data structure can include program instructions (e.g., application code 1003), communicated through communications link 1015 and communications interface 1014. Received program code may be executed by data processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

Processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1007. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to event-based clustering of collaboration entities in highly dynamic shared content environments. A module may include one or more state machines and/or combinational logic used to implement or facilitate the operational and/or performance characteristics pertaining to event-based clustering of collaboration entities in highly dynamic shared content environments.

Various implementations of database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of event-based clustering of collaboration entities in highly dynamic shared content environments). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to event-based clustering of collaboration entities in highly dynamic shared content environments, and/or for improving the way data is manipulated when performing computerized operations that pertain to responding to a stream of entity interaction events to cause ongoing updates to collaboration clusters and corresponding cluster affinity scores, so as to facilitate real-time collaboration group recommendations.

Figure 10B:
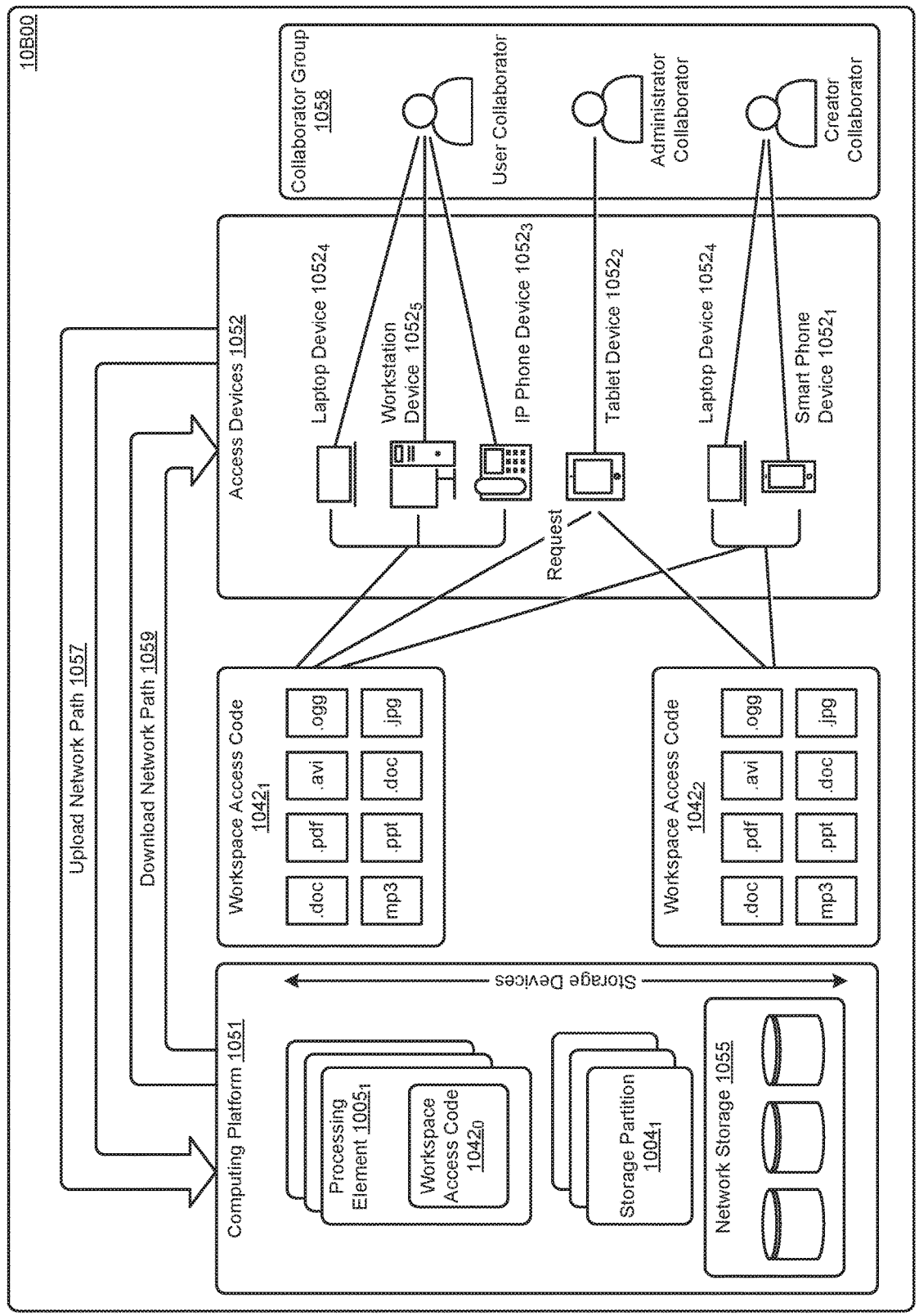

FIG. 10B depicts a block diagram of an instance of a cloud-based environment 10B00. Such a cloud-based environment supports access to workspaces through the execution of workspace access code (e.g., workspace access code $1042_0$, workspace access code $1042_1$, and workspace access code $1042_2$). Workspace access code can be executed on any of access devices 1052 (e.g., laptop device $1052_4$, workstation device $1052_5$, IP phone device $1052_3$, tablet device $1052_2$, smart phone device $1052_1$, etc.). A group of users can form a collaborator group 1058, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1051, including in a middleware setting. As shown, a portion of the workspace access code resides in and can be executed on one or more processing elements (e.g., processing element $1005_1$). The workspace access code can interface with storage devices such as networked storage 1055. Storage of workspaces and/or any constituent files or objects, and/or any other code or scripts or data can be stored in any one or more storage partitions (e.g., storage partition $1004_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1057). A stored workspace can be delivered to a particular user and/or shared with other particular users via a download (e.g., a download from a processing element to an access device over a download network path 1059).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for forming collaboration groups, the method comprising:
   identifying a plurality of users that access a distributed computing and storage platform to interact with a plurality of content objects that are managed by the distributed computing and storage platform;
   identifying a plurality of entities in the distributed computing and storage platform, the entities being associated with one or more entity interaction events;
   receiving, responsive to an occurrence of at least one of the entity interaction events, at least one entity relationship score, the entity relationship score quantifying a relationship between two subject entities from the entities, wherein the two subject entities are associated with the at least one of the entity interaction events;
   assigning at least one of the subject entities to one or more clusters;
   calculating one or more cluster affinity scores corresponding to at least one of the subject entities, the cluster affinity scores based at least in part on the entity relationship score;
   selecting at least one target cluster from the clusters, the at least one target cluster being selected based at least in part on the cluster affinity scores;
   wherein the target cluster is selected by accessing a data structure that stores the cluster affinity scores sorted by a respective score value, the cluster affinity scores are based at least in part on combinations of sets of time-decayed individual entity relationship scores, and the data structure comprises a composite key; and
   marking at least one of the clusters as no longer interesting when the entity relationship score decays to a zero value.

2. The method of claim 1, further comprising emitting a collaboration group recommendation that is derived from the at least one target cluster.

3. The method of claim 2, wherein the collaboration group recommendation comprises a group identifier associated with the target cluster.

4. The method of claim 3, wherein the group identifier associated with the target cluster is presented at a user interface.

5. The method of claim 1, wherein the data structure is a key-value store.

6. The method of claim 1, wherein the composite key comprises at least one of, a partition key, a sort key, an entity type, an entity identifier, a metric type, a timestamp, or a cluster identifier.

7. The method of claim 1, wherein the entities comprise at least one of, one or more users, one or more content objects, one or more files, one or more folders, one or more computing devices, one or more computing processes, or at least one enterprise.

8. The method of claim 1, wherein the cluster affinity scores are based at least in part on combinations of sets of individual entity relationship scores.

9. The method of claim 8, wherein the combinations of sets of individual entity relationship scores comprise individual entity relationship scores that are determined by combinations of entities in a particular cluster.

10. A computer readable medium, embodied in a non-transitory computer readable medium, the non-transitory computer readable medium having stored thereon a sequence of instructions which, when stored in memory and executed by one or more processors causes the one or more processors to perform a set of acts for forming collaboration groups, the acts comprising:
   identifying a plurality of users that access a distributed computing and storage platform to interact with a plurality of content objects that are managed by the distributed computing and storage platform;
   identifying a plurality of entities in the distributed computing and storage platform, the entities being associated with one or more entity interaction events;
   receiving, responsive to an occurrence of at least one of the entity interaction events, at least one entity relationship score, the entity relationship score quantifying a relationship between two subject entities from the entities, wherein the two subject entities are associated with the at least one of the entity interaction events;

assigning at least one of the subject entities to one or more clusters;

calculating one or more cluster affinity scores corresponding to at least one of the subject entities, the cluster affinity scores based at least in part on the entity relationship score;

selecting at least one target cluster from the clusters, the at least one target cluster being selected based at least in part on the cluster affinity scores;

wherein the target cluster is selected by accessing a data structure that stores the cluster affinity scores sorted by a respective score value, the cluster affinity scores are based at least in part on combinations of sets of time-decayed individual entity relationship scores, and the data structure comprises a composite key; and marking at least one of the clusters as no longer interesting when the entity relationship score decays to a zero value.

11. The computer readable medium of claim 10, further comprising instructions which, when stored in memory and executed by the one or more processors causes the one or more processors to perform acts of emitting a collaboration group recommendation that is derived from the at least one target cluster.

12. The computer readable medium of claim 11, wherein the collaboration group recommendation comprises a group identifier associated with the target cluster.

13. The computer readable medium of claim 12, wherein the group identifier associated with the target cluster is presented at a user interface.

14. The computer readable medium of claim 10, wherein the cluster affinity scores are based at least in part on combinations of sets of individual entity relationship scores.

15. The computer readable medium of claim 10, wherein the combinations of sets of individual entity relationship scores comprise individual entity relationship scores that are determined by combinations of entities in a particular cluster.

16. A system for forming collaboration groups, the system comprising:

a storage medium having stored thereon a sequence of instructions; and one or more processors that execute the instructions to cause the one or more processors to perform a set of acts, the acts comprising, identifying a plurality of users that access a distributed computing and storage platform to interact with a plurality of content objects that are managed by the distributed computing and storage platform;

identifying a plurality of entities in the distributed computing and storage platform, the entities being associated with one or more entity interaction events;

receiving, responsive to an occurrence of at least one of the entity interaction events, at least one entity relationship score, the entity relationship score quantifying a relationship between two subject entities from the entities, wherein the two subject entities are associated with the at least one of the entity interaction events;

assigning at least one of the subject entities to one or more clusters;

calculating one or more cluster affinity scores corresponding to at least one of the subject entities, the cluster affinity scores based at least in part on the entity relationship score;

selecting at least one target cluster from the clusters, the at least one target cluster being selected based at least in part on the cluster affinity scores;

wherein the target cluster is selected by accessing a data structure that stores the cluster affinity scores sorted by a respective score value, the cluster affinity scores are based at least in part on combinations of sets of time-decayed individual entity relationship scores, and the data structure comprises a composite key; and marking at least one of the clusters as no longer interesting when the entity relationship score decays to a zero value.

17. The system of claim 16, further comprising instructions to cause the one or more processors to perform:

emitting a collaboration group recommendation that is derived from the at least one target cluster.

18. The system of claim 17, wherein the collaboration group recommendation comprises a group identifier associated with the target cluster.

19. The system of claim 18, wherein the group identifier associated with the target cluster is presented at a user interface.

20. The system of claim 16, wherein the cluster affinity scores are based at least in part on combinations of sets of individual entity relationship scores.

* * * * *